US008192275B2

(12) United States Patent
Aoki et al.

(10) Patent No.: US 8,192,275 B2
(45) Date of Patent: Jun. 5, 2012

(54) GAMING SYSTEM WITH CASCADING SYMBOL FEATURE

(75) Inventors: Dion K. Aoki, Henderson, NV (US); Allon G. Englman, Chicago, IL (US); Joel R. Jaffe, Glenview, IL (US); Shridhar P. Joshi, Naperville, IL (US); Larry J. Pacey, Northbrook, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 802 days.

(21) Appl. No.: 12/299,593

(22) PCT Filed: May 3, 2007

(86) PCT No.: PCT/US2007/010615

§ 371 (c)(1),
(2), (4) Date: Nov. 4, 2008

(87) PCT Pub. No.: WO2007/130443

PCT Pub. Date: Nov. 15, 2007

(65) Prior Publication Data

US 2009/0069071 A1 Mar. 12, 2009

Related U.S. Application Data

(60) Provisional application No. 60/797,451, filed on May 4, 2006, provisional application No. 60/876,811, filed on Dec. 21, 2006.

(51) Int. Cl.
*A63F 13/00* (2006.01)

(52) U.S. Cl. ................ 463/20; 463/16; 463/17; 463/18; 463/19; 463/21

(58) Field of Classification Search ............... 463/16–21
See application file for complete search history.

(56) References Cited

U.S. PATENT DOCUMENTS

| | | | | |
|---|---|---|---|---|
| 5,769,716 | A * | 6/1998 | Saffari et al. | 463/20 |
| 5,833,537 | A * | 11/1998 | Barrie | 463/21 |
| 6,641,477 | B1 * | 11/2003 | Dietz, II | 463/20 |
| 6,731,313 | B1 * | 5/2004 | Kaminkow | 715/839 |
| 6,910,962 | B2 * | 6/2005 | Marks et al. | 463/16 |
| 7,195,559 | B2 * | 3/2007 | Gilmore et al. | 463/20 |
| 7,252,591 | B2 * | 8/2007 | Van Asdale | 463/22 |
| 7,666,085 | B2 * | 2/2010 | Vorias et al. | 463/20 |
| 7,749,063 | B2 * | 7/2010 | Belger et al. | 463/16 |
| 2004/0048646 | A1 * | 3/2004 | Visocnik | 463/16 |
| 2004/0048650 | A1 | 3/2004 | Mierau et al. | |
| 2004/0048651 | A1 | 3/2004 | Vorias et al. | |
| 2006/0046830 | A1 * | 3/2006 | Webb | 463/20 |
| 2006/0068881 | A1 * | 3/2006 | Casey | 463/20 |
| 2006/0068886 | A1 * | 3/2006 | Takano et al. | 463/20 |
| 2007/0026933 | A1 * | 2/2007 | Tanimura | 463/20 |
| 2007/0155474 | A1 * | 7/2007 | Gauselmann | 463/20 |
| 2008/0051174 | A1 * | 2/2008 | Fiden | 463/20 |

* cited by examiner

*Primary Examiner* — Dmitry Suhol
*Assistant Examiner* — David Duffy
(74) *Attorney, Agent, or Firm* — Nixon Peabody LLP

(57) ABSTRACT

A gaming system comprising an input device for receiving a wager to play a wagering game. The gaming system also includes a display for displaying an array of symbols that indicate a randomly selected outcome of the wagering game. In response to the randomly selected outcome including a winning symbol combination, at least one symbol that is not a part of the winning symbol combination is removed from the array and causes other symbols to move into a position of the array vacated by the at least one removed symbol.

20 Claims, 38 Drawing Sheets

GAMING SYSTEM WITH CASCADING SYMBOL FEATURE

CROSS-REFERENCE TO RELATED APPLICATIONS

This application is a U.S. national phase of International Application No.

PCT/US2007/010615, filed May 3, 2007, which claims priority to pending U.S. Provisional Application No. 60/797,451 entitled "Gaming System With Cascading Symbol Feature" and co-pending U.S. Provisional Patent Application No. 60/797,600 entitled "Wagering Game With Symbols Forming An Altered Or Secondary Array" both filed on May 4, 2006 and from U.S. Provisional Patent Application No. 60/876,811 filed Dec. 12, 2006, all of which are being incorporated in their entirety by reference.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming systems and methods for playing wagering games, and more particularly, to gaming systems and methods having a cascading symbol feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

According to one embodiment of the present invention, a gaming system is provided and includes an input device for receiving a wager to play a wagering game. A display for displaying an array of symbols that indicates a randomly selected outcome of the wagering game is also included. In response to the randomly selected outcome including a winning symbol combination, at least one symbol that is not a part of the winning symbol combination is removed from the array and causes other symbols to move into a position of the array vacated by the at least one removed symbol.

According to another embodiment of the present invention, a method of conducting a wagering game is provided. The method includes displaying a plurality of symbols in an array indicating the randomly selected outcome. In response to a randomly selected outcome including a winning symbol combination, at least one symbol that is not a part of the winning symbol combination is removed and other symbols move into a position of the array vacated by the at least one removed symbol.

According to another embodiment of the present invention, a gaming system is provided and includes an input device for receiving a wager to play a wagering game and a display for displaying an array of symbols that indicate a randomly selected outcome of the wagering game. At least one symbol in the array has an initial state. A controller is coupled to the input device and the display and is operative to cause the at least one symbol to transition from the initial state to an intermediate state in response to a first play of the wagering game meeting a first predetermined criterion. In response to a subsequent play of the wagering game meeting a second predetermined criterion, the controller causes the at least one symbol to transition from the intermediate state to a removable state.

According to yet another embodiment of the present invention, a method of conducting a wagering game is provided. The method includes displaying a plurality of symbols in an array indicating a randomly selected outcome. At least one symbol is in an initial state. In response to a first predetermined criterion being met during a first play of the wagering game, the at least one symbol transitions from the initial state to an intermediate state. In response to a second predetermined criterion being met during a subsequent play of the wagering game, the at least one symbol in the array enters a removable state. The at least one symbol is removed from the array.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

DETAILED DESCRIPTION

Figure 1:
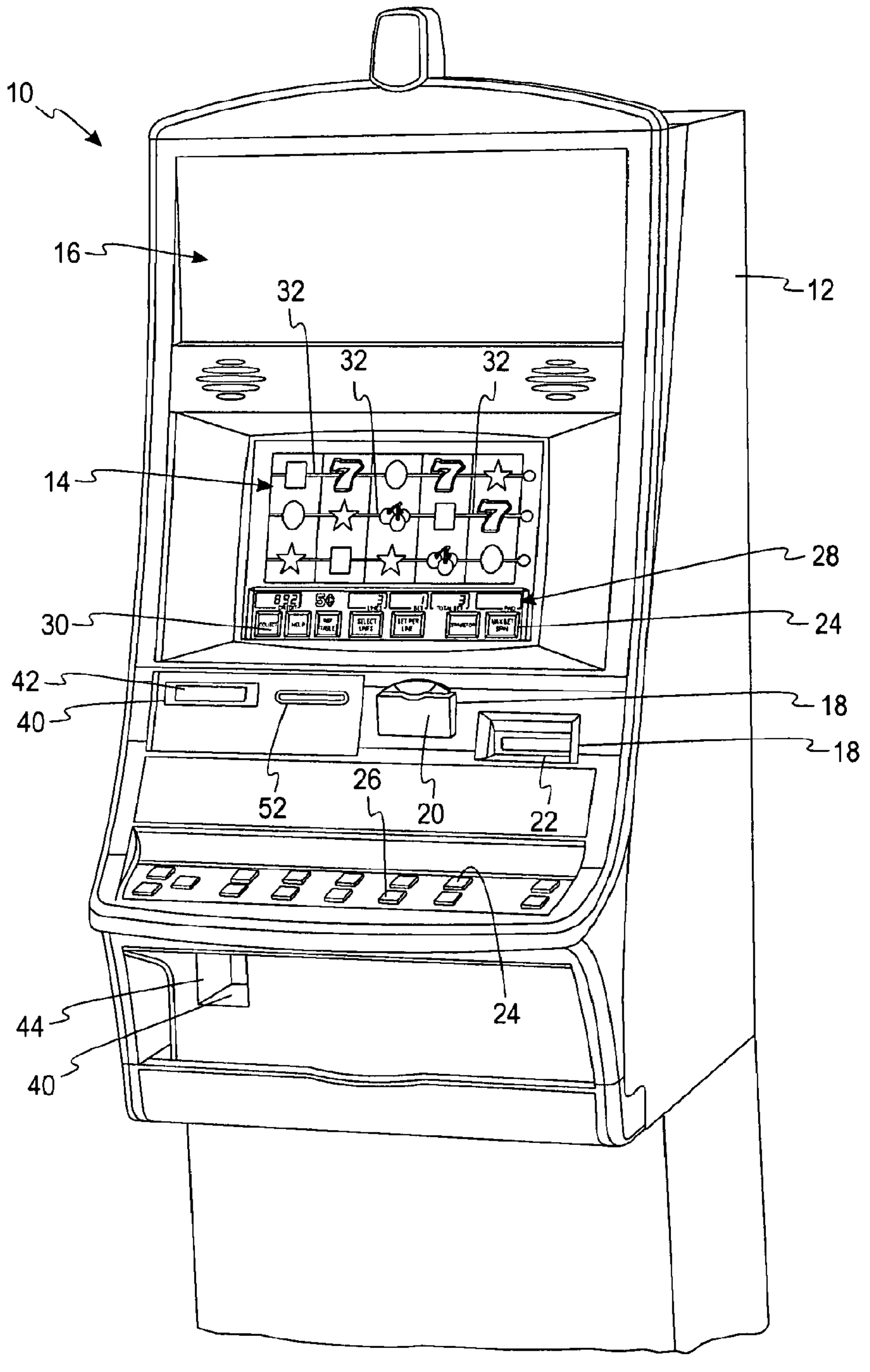
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12 or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one pay line 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch keys 30. The basic game consists of a plurality of symbols arranged in an array, and includes at least one pay line 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
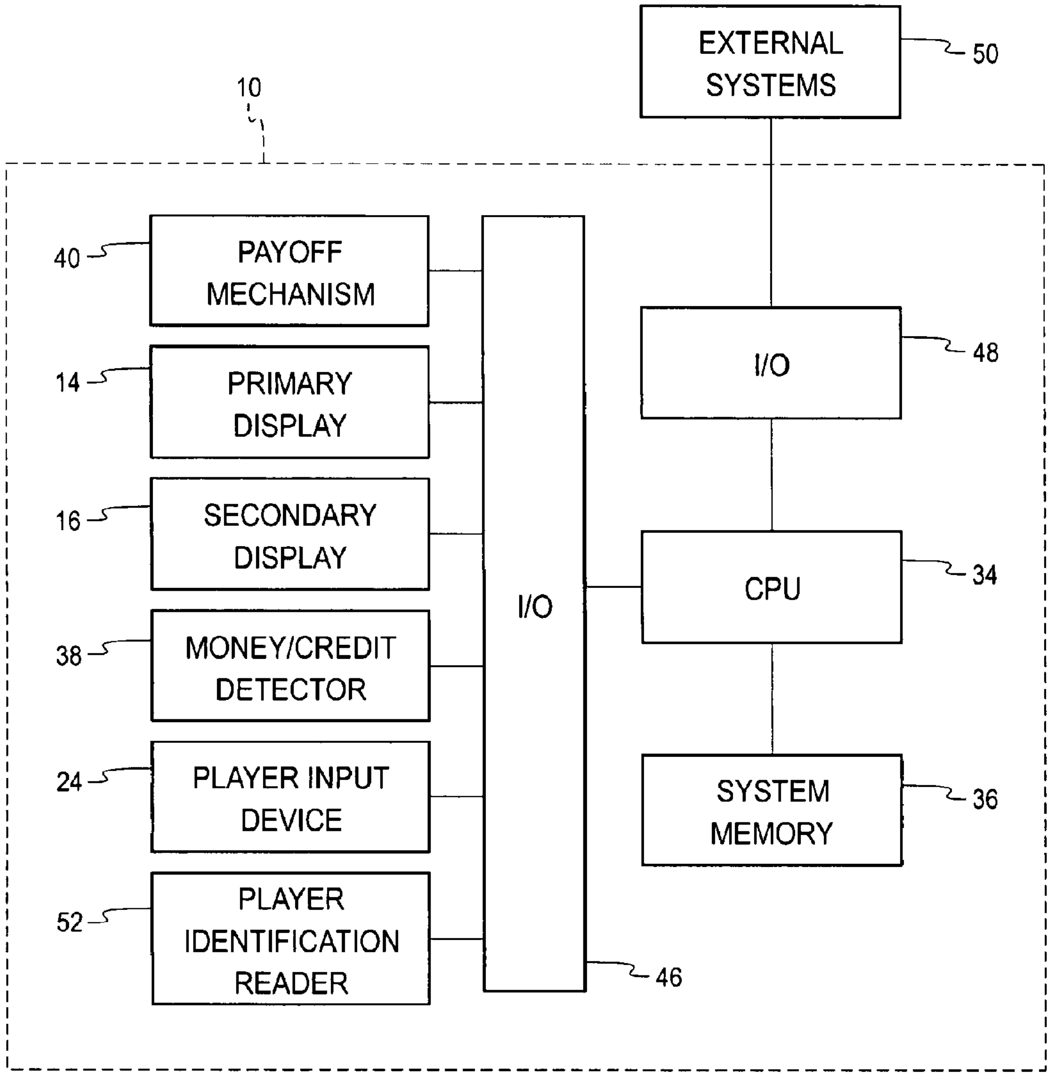
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
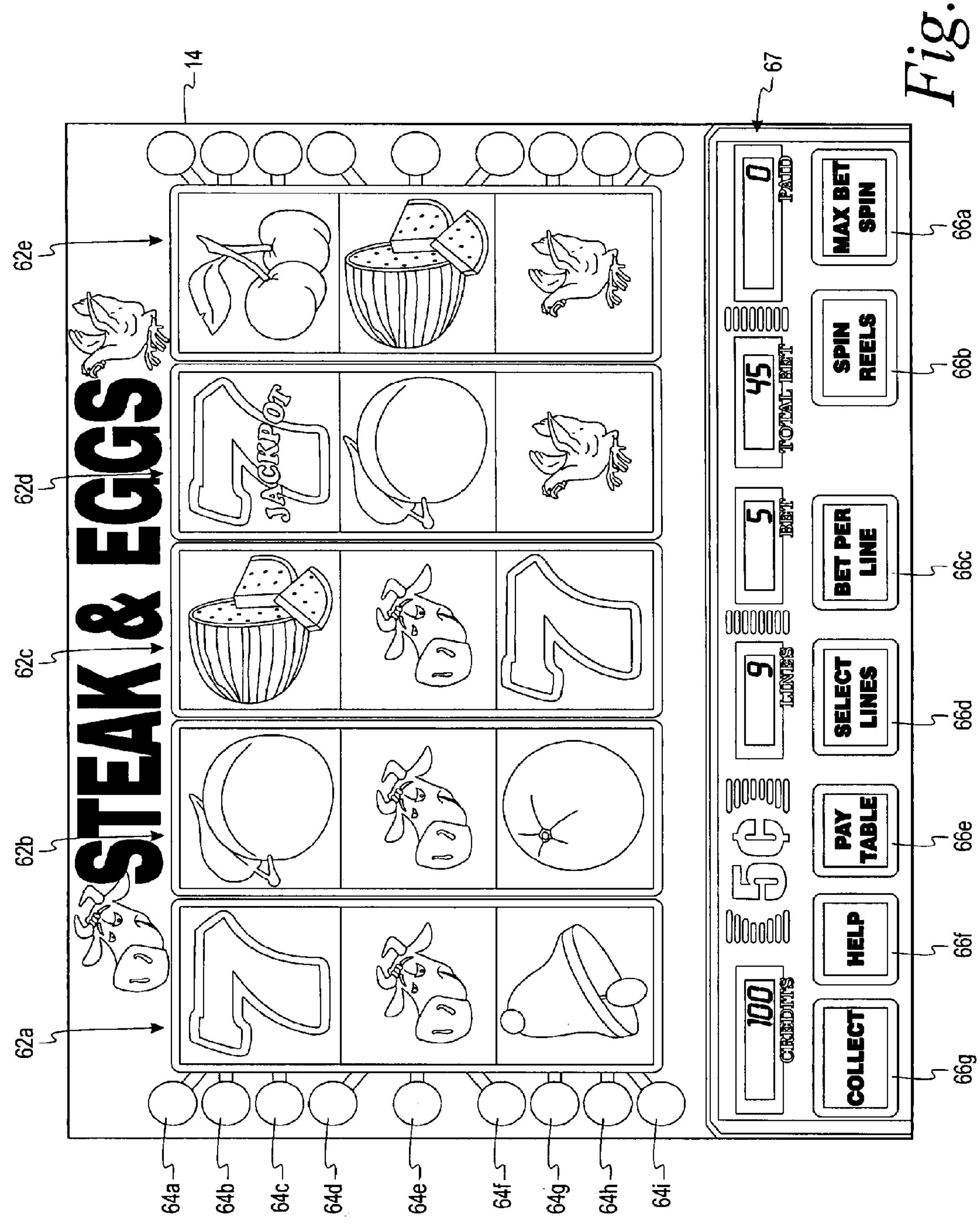
FIG. 3 is a display of an initial basic game screen according to one embodiment of the invention.

Turning now to FIG. 3, the primary display 14 according to one embodiment of the present invention is illustrated. In this embodiment, the basic game is a slot machine game with symbols on five different reels 62*a*, 62*b*, 62*c*, 62*d*, 62*e*. The reels 62*a-e* may be traditional mechanical reels, electromechanical reels, or computer-generated images of reels, with each reel composed of a plurality of symbols. In this embodiment, there are multiple pay lines 64*a-i* across the various reels 62*a-e*. While multiple pay lines 64*a-i* are shown, the gaming machine 10 may alternatively include a single pay line.

During the basic game, the player places a wager on any number of pay lines 64*a-i*. In the illustrated embodiment, the wager may be from one to five credits per pay line 64*a-i*. However, in other embodiments, other wager amounts may be made. Once the player has placed the wager, the reels 62*a-e* begin to spin. As illustrated in FIG. 3, near the bottom of the primary display 14 there are a plurality of keys 66*a-g* that enable the player to perform various functions, such as selecting the pay lines to play, selecting a wager amount per pay line, and initiating a spin of the reels. Meters 67 are located above the keys 66*a-g* and provide the player with information such as the number of credits available, the number of lines selected, the bet per line, the total bet (which equals the number of lines selected multiplied by the bet per line), and the number of credits won.

Subscript Bombs

Figure 4:
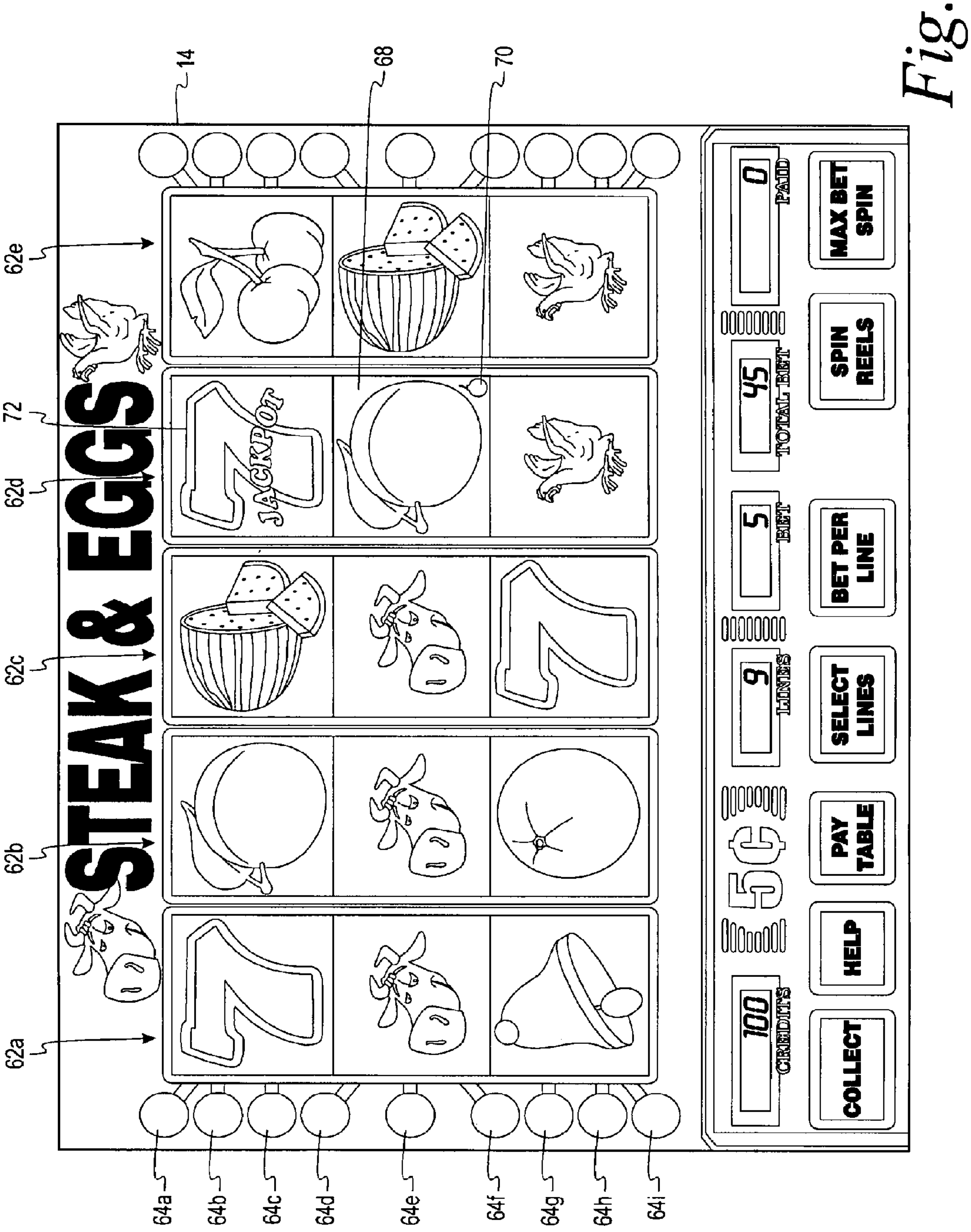
FIG. 4 is a display of an initial basic game screen according to another embodiment of the present invention.

Turning now to FIG. 4, the primary display 14 of a wagering game according to one embodiment of the present invention is illustrated. In this embodiment, the player has made a wager, and the reels 62*a-e* have spun. The three cow symbols along one of the active pay lines 64*a-i* create a winning combination, and the player is paid out the appropriate amount.

In most gaming machines, the basic game would then end. However, in this embodiment of the present invention, bomb symbol subscripts 70 are associated with some of the reel symbols or symbol positions. If the bomb symbol subscript 70 appears on an active pay line, the bomb 70 explodes, removing the main symbol from the primary display 14 and causing the other symbols to cascade.

Generally, in a cascade, a symbol in the primary display 14 disappears, and a symbol that is adjacent to the disappearing symbol moves and fills in the position vacated by the disappearing symbol. In this illustrated embodiment, the cascade occurs from top to bottom, meaning that the symbol above the disappearing symbol drops into the vacant position.

As shown, the bomb symbol subscript 70 does not have any connection to the three cow symbols in the winning combination. A bomb symbol subscript 70 can be on any symbol, whether or not that symbol is a part of a winning combination.

In the present embodiment, a peach symbol 68 includes the bomb symbol subscript 70. The bomb 70 explodes (FIG. 5), causing the peach symbol 68 to disappear. In some embodiments, the bomb 70 may only explode if the peach symbol 68 is on an active pay line. After the bomb 70 explodes, a symbol 72 above the exploded peach symbol 68 cascades down and fills the position vacated by the disappearing peach symbol 68. As shown in FIG. 6, the jackpot seven symbol 72 cascades down into the position vacated by the disappearing peach symbol 68 and a randomly selected symbol, e.g., orange symbol 74, enters from the top and drops into the position vacated by the cascading jackpot seven symbol 72.

After the cascade, the gaming machine 10 rewards the player for any new winning combinations. In some embodiments, the gaming machine 10 may pay out for the winning combination of the three cow symbols again. In other embodiments, the gaming machine 10 may only pay out for each winning combination once. If there are any other bomb symbol subscripts, then those will explode and cause more cascading. In some embodiments, the bomb symbol subscripts will only cause cascades if there are additional winning outcomes. In other embodiments, the cascades will occur regardless of whether there are any other winning combinations.

Figure 5:
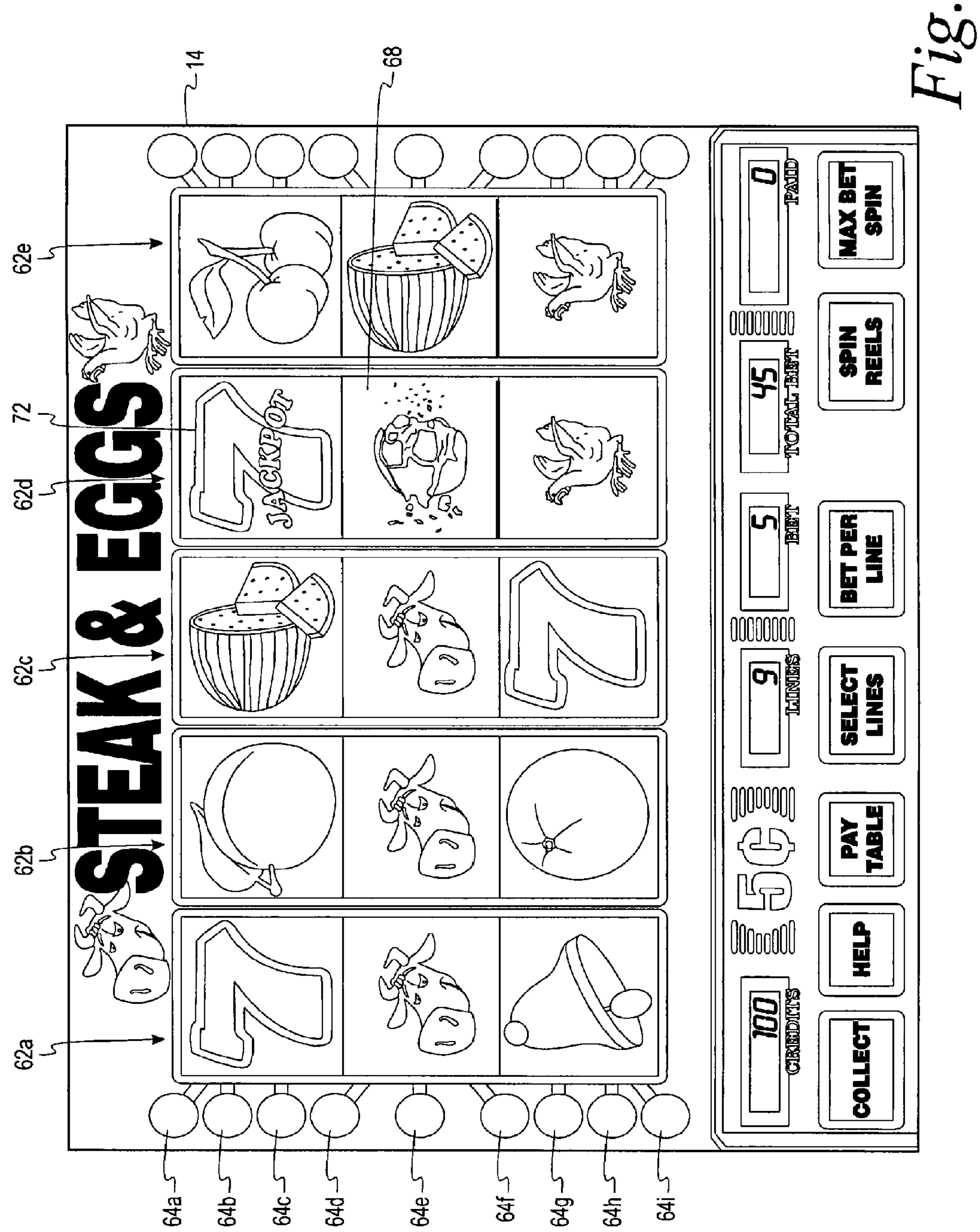
FIG. 5 is a display of a screen subsequent to FIG. 4.
Figure 6:
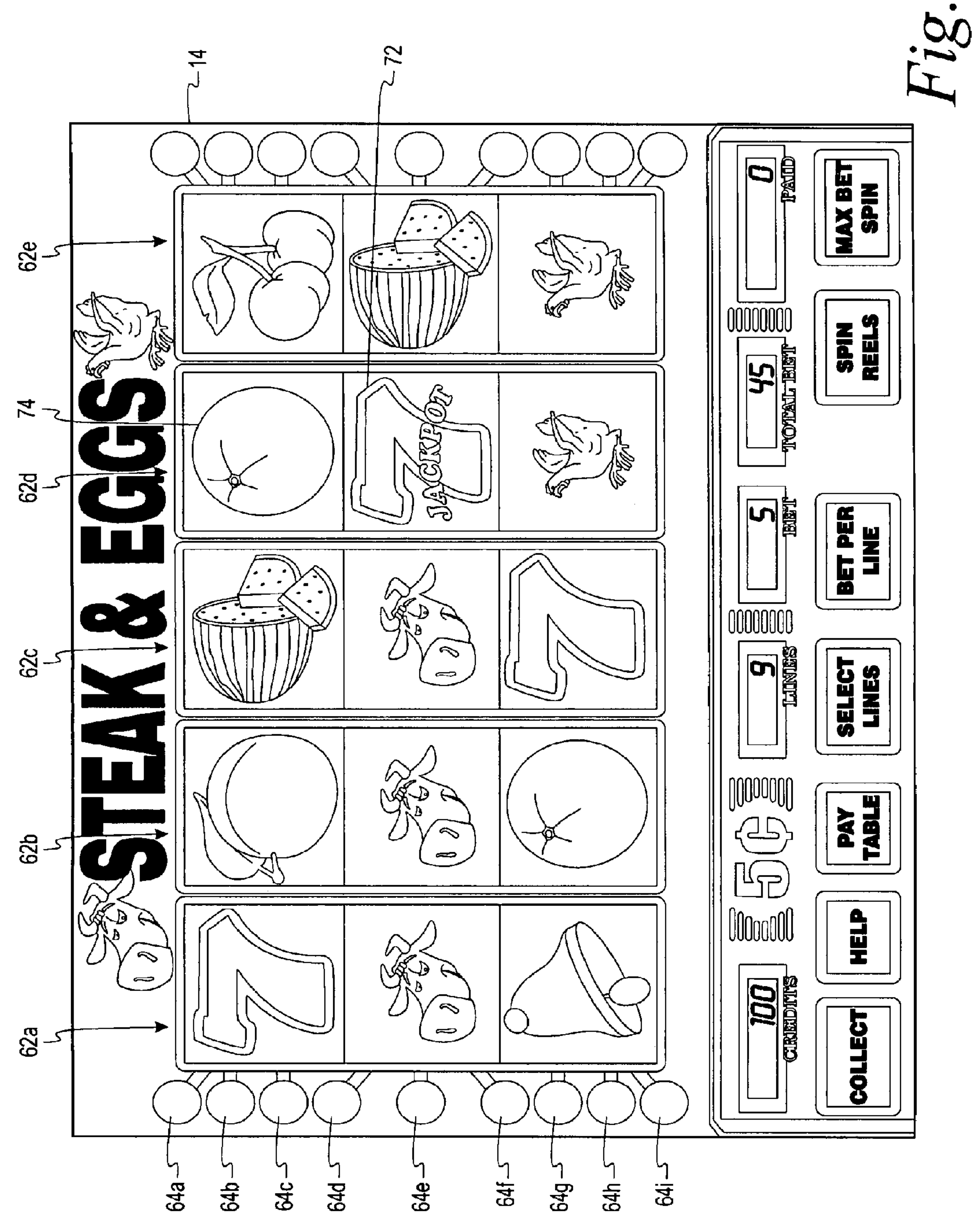
FIG. 6 is a display of a screen subsequent to FIG. 5.

In the embodiment illustrated in FIGS. 4-6, the bomb symbol subscript 70 is permanently present on peach symbol 68. In other embodiments, the bomb symbol subscript 70 may appear on the peach symbol 68 after the reels 62*a-e* quit spinning.

In one example, a method of conducting a wagering game having a randomly selected outcome includes displaying a plurality of symbols in an array indicating the randomly selected outcome. In response to the randomly selected outcome including at least one symbol having a subscript symbol, removing the at least one symbol having the subscript symbol and other symbols are moved into a position of the array vacated by the at least one removed symbol.

Subscript Nudges

Figure 7:
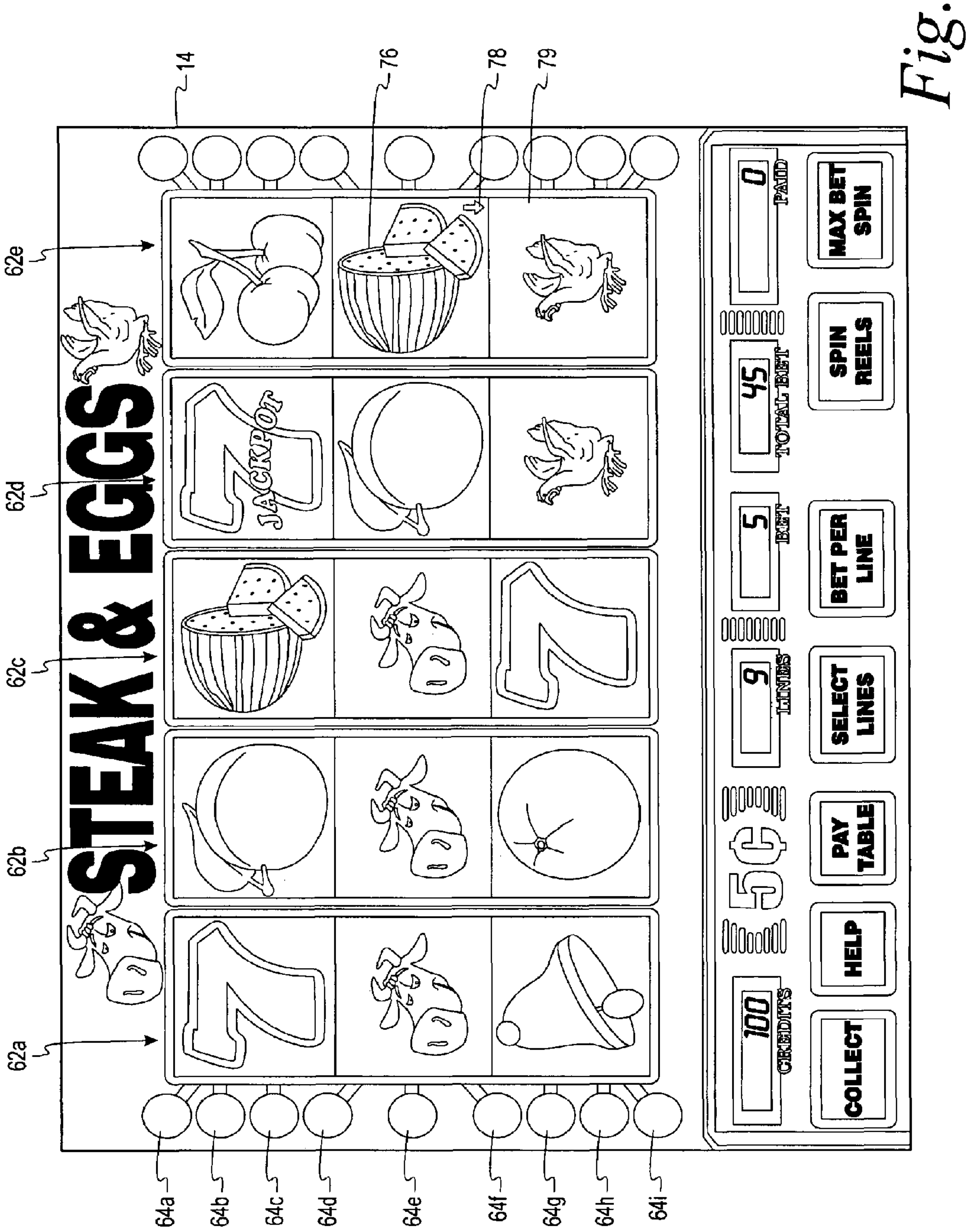
FIG. 7 is a display of an initial basic game screen according to another embodiment of the present invention.

Turning now to FIG. 7, another embodiment of the present invention is described below. In this embodiment, a watermelon symbol 76 includes a nudge symbol subscript 78. As in the embodiment of FIGS. 4-6, after the reels 62*a-e* have spun, the gaming machine 10 awards the player a corresponding award for a winning combination along any active pay lines 64*a-i*. The gaming machine 10 then responds to any nudge symbol subscripts 78.

Figure 8:
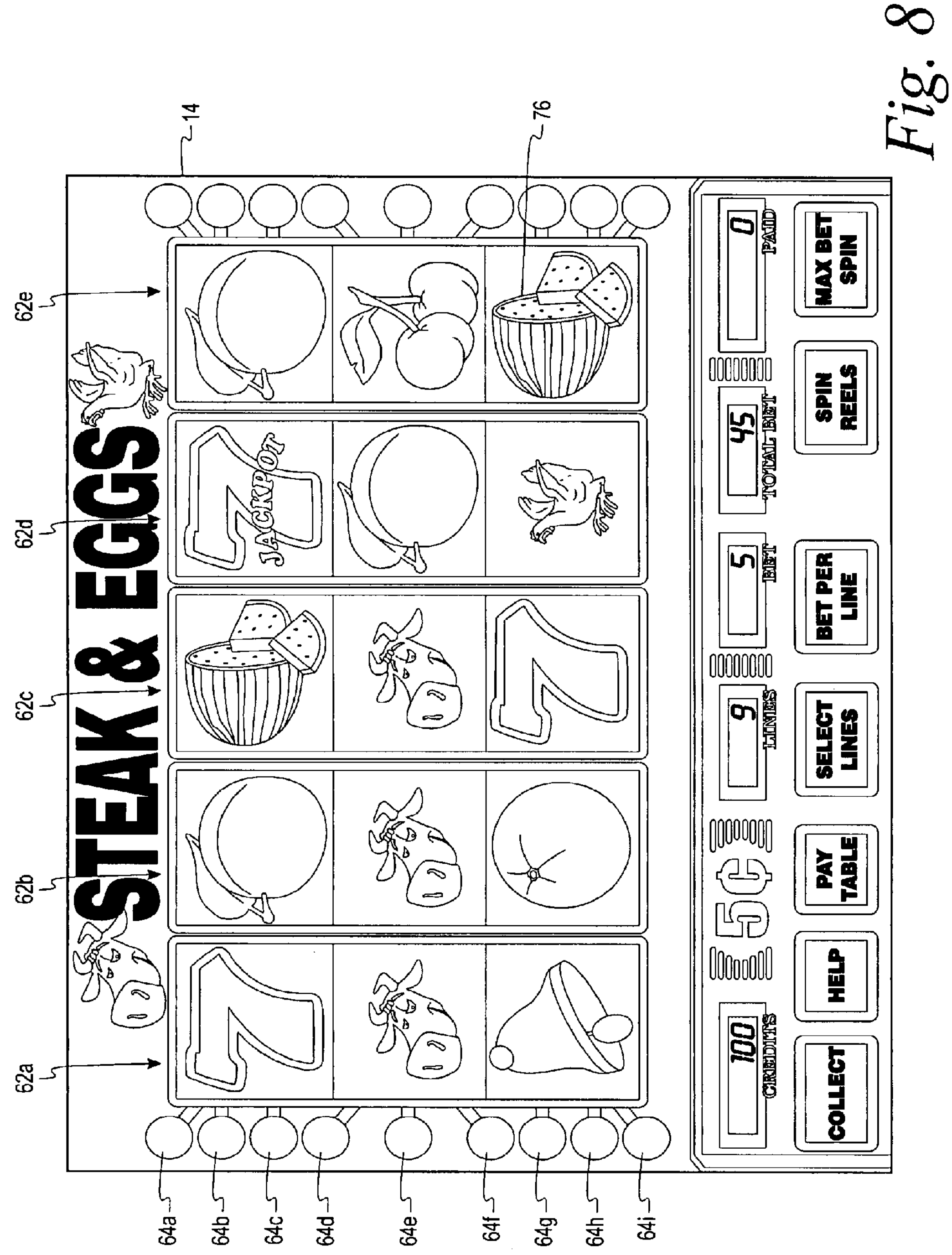
FIG. 8 is a display of a screen subsequent to FIG. 7.

In the illustrated embodiment, the nudge symbol subscript 78 is a downward arrow, meaning that the watermelon symbol 76 associated with the nudge symbol subscript 78 shifts down by one position. In one embodiment, illustrated in FIG. 8, the watermelon symbol 76 completely replaces a chicken symbol 79 (FIG. 7) that is below the watermelon symbol 76. A cherry symbol above the watermelon symbol 76 cascades down and fills the position vacated by the nudged watermelon symbol 76, and a randomly selected symbol enters from the top and drops into the position vacated by the cascading cherry symbol. In this embodiment, the gaming machine 10 would then award the player for any more winning combinations. Again, in some embodiments, the original winning combination of the three cow symbols may be paid again, while in others, the gaming machine 10 will only pay it the first time.

Although the nudge symbol subscript 78 is a downward arrow, it may be any directional indicator and may point in any direction. For example, the nudge symbol subscript 78 may point to either the left or the right, causing the symbol associated with the nudge symbol subscript 78 to shift sideways. Also, although only one nudge symbol subscript is illustrated, there may be none or multiple nudge symbol subscripts on any given spin of the reels.

Figure 9:
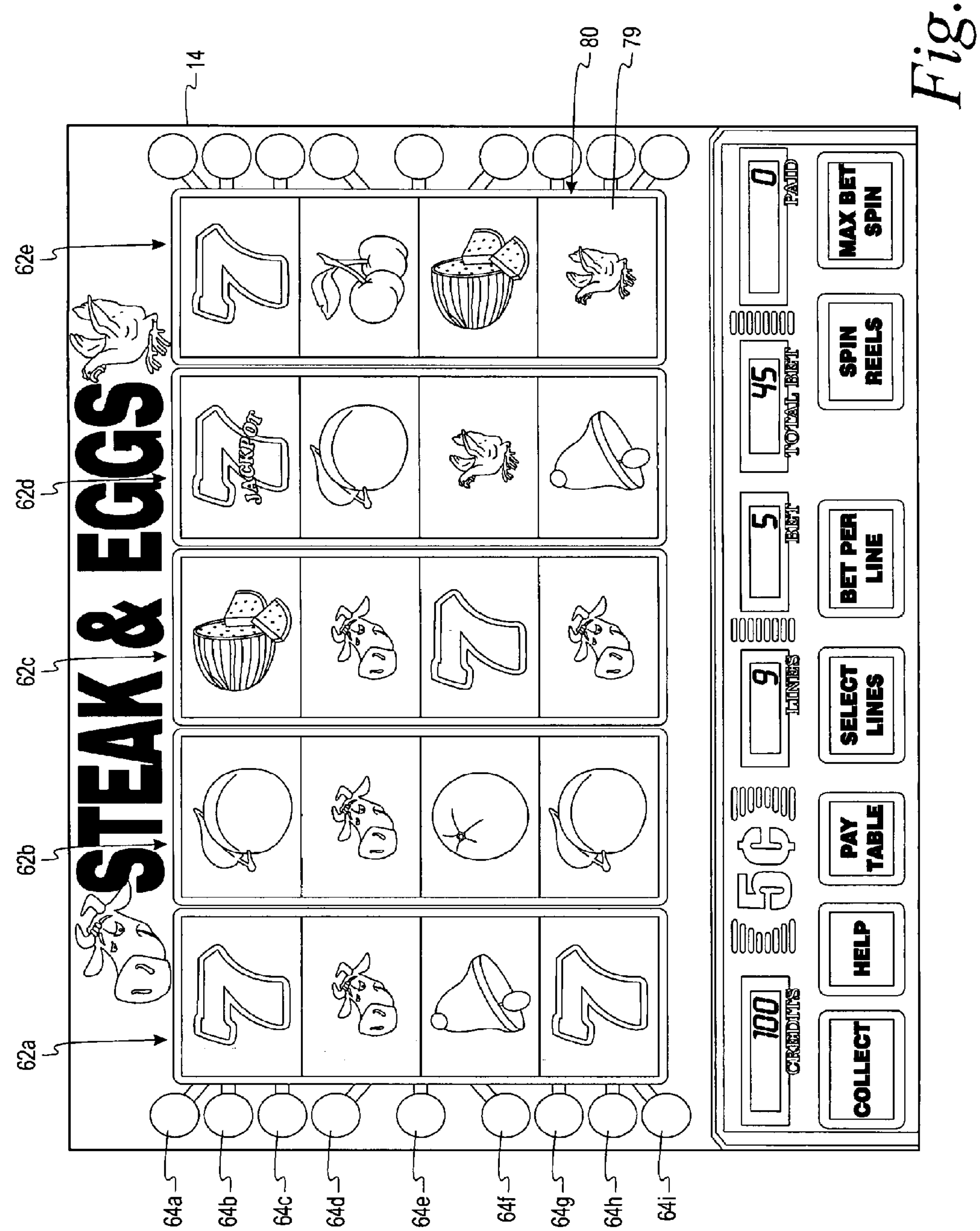
FIG. 9 is a display of a screen subsequent to FIG. 7.

FIG. 9 illustrates an alternative outcome of the nudge from FIG. 7. In this embodiment, instead of causing the chicken symbol 79 to disappear, a new symbol row 80 is created, and the chicken symbol 79 falls into the new row 80. The other positions in the new row 80 may remain vacant, or they may, as shown in FIG. 9, be populated with symbols. After the new row 80 is created (and populated, if needed), the gaming machine 10 awards the player for any winning pay line.

In another embodiment, instead of creating the new row 80, the chicken symbol 79 and the watermelon symbol 76 could occupy the same cell in the array. As such, the chicken symbol 79 does not disappear, but the nudge of the watermelon symbol 76 still occurs. By creating the new row 80 or having two or more symbols share one position on a reel 62, the gaming machine 10 is increasing the player's odds of winning on any particular spin, which adds player excitement.

In one embodiment, a method of conducting a wagering game having a randomly selected outcome includes displaying a plurality of symbols in an array indicating the randomly selected outcome. In response to the randomly selected outcome including at least one symbol having a subscript symbol, the at least one symbol is nudged in a direction indicated by the subscript symbol and other symbols are moved into a position of the array vacated by the at least one nudged symbol.

Although the embodiments illustrated in FIGS. 4-6 and 7-9 have a winning combination on the first spin (the three cow symbols), there does not need to be a winning combination for the subscript features to initiate symbol movement.

Replacing at Least Some of the Winning Symbols

Figure 10:
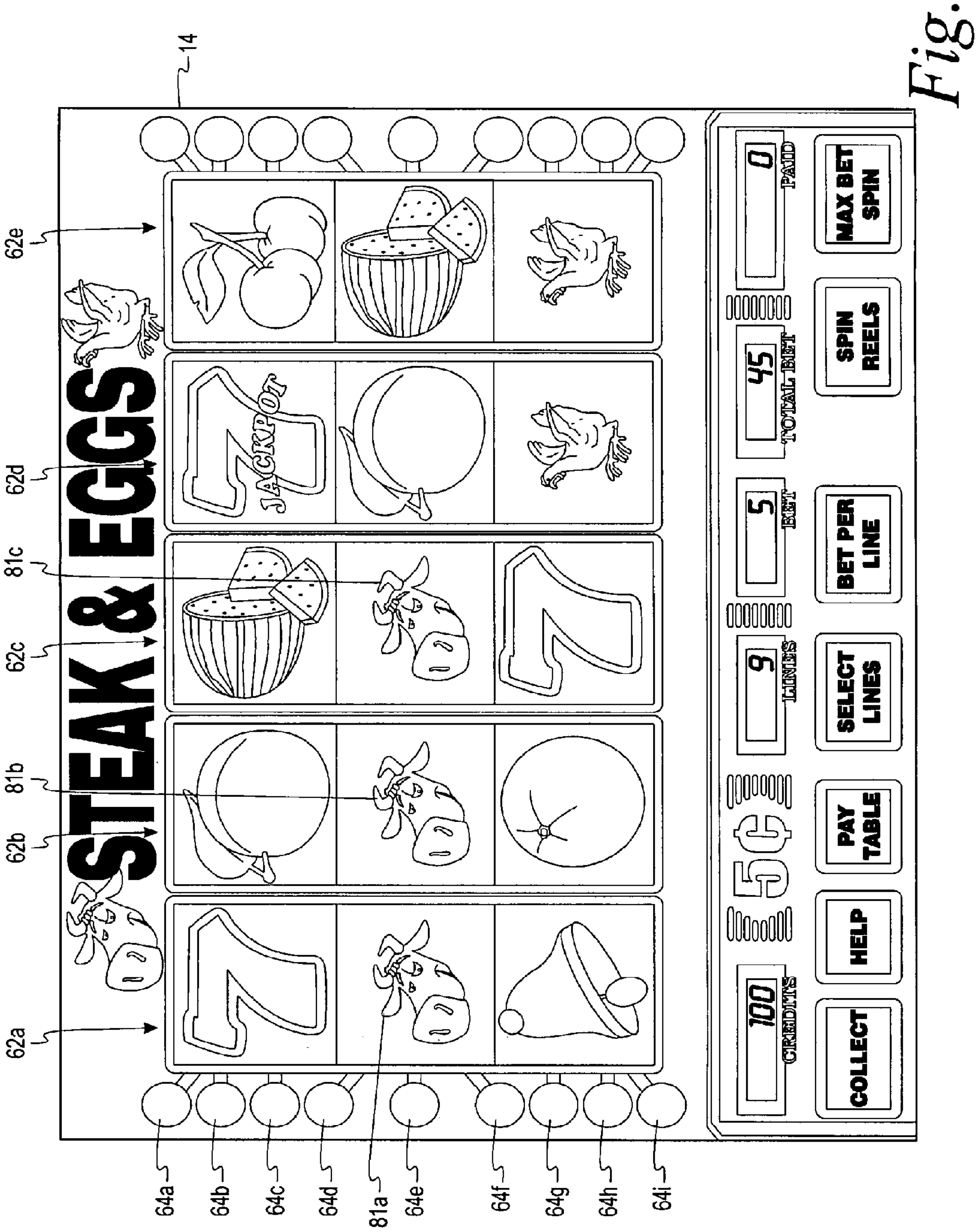
FIG. 10 is a display of an initial basic game screen according to yet another embodiment of the invention.
Figure 11:
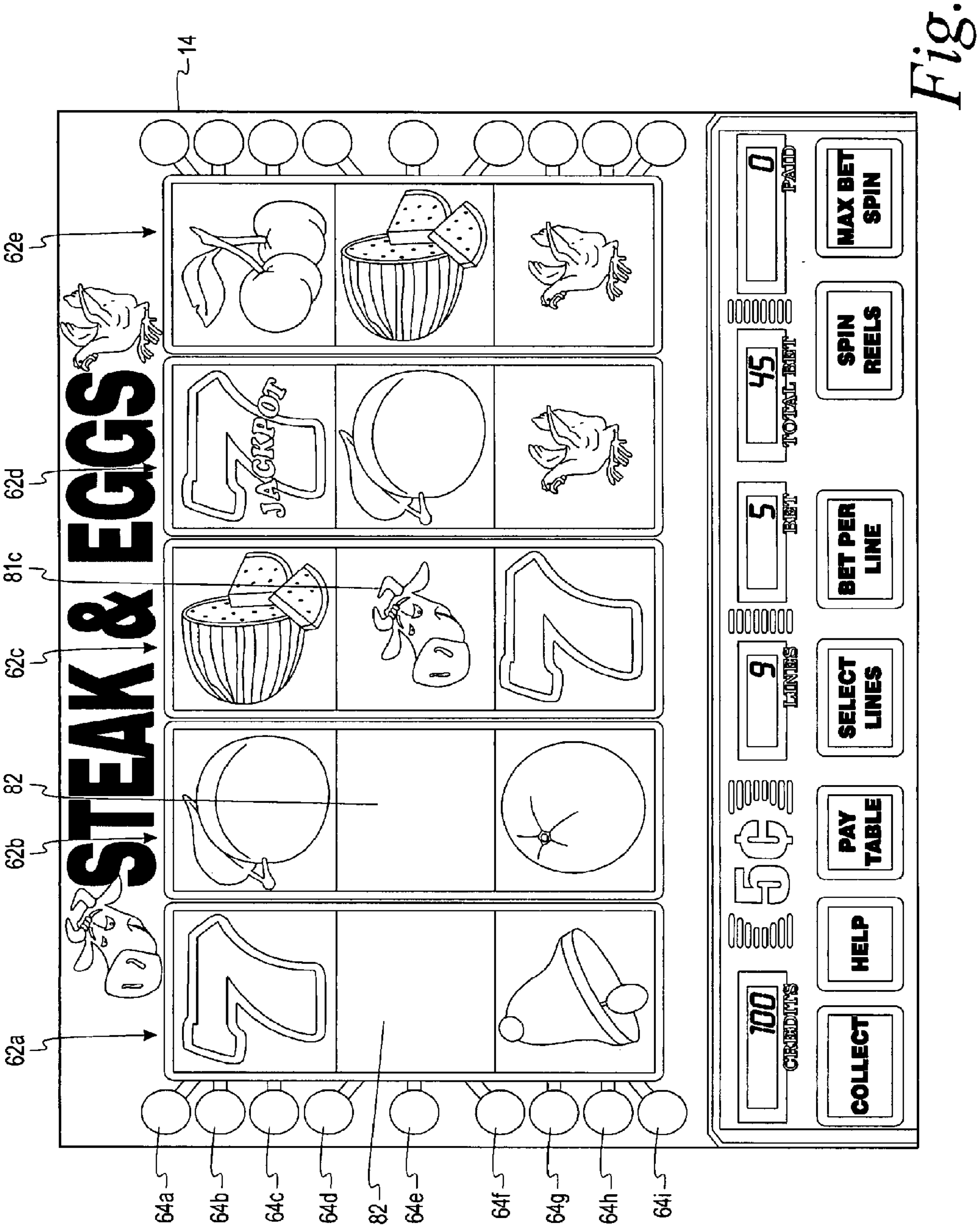
FIG. 11 is a display of a screen subsequent FIG. 10.

Turning now to FIG. 10, another embodiment of the present invention is illustrated. In this embodiment, the player has spun the reels and there is a winning combination of three cow symbols 81*a*, 81*b*, 81*c* along the middle pay line 64*a-i*. In this embodiment, one or more of the symbols from the winning combination are removed. The illustrated embodiment of FIG. 11 shows two of the cow symbols 81*a*, 81*b* being removed (although any number of the symbols from the winning combination could be removed), leaving two vacant positions 82.

After the two symbols are removed, two new randomly selected symbols appear in their place. In the embodiment shown in FIG. 12, the two vacant positions 82 (FIG. 11) have been replaced by new symbols 84. The gaming machine 10 then pays the player for any new winning combinations. If a new winning outcome is achieved, in some embodiments, the gaming machine 10 begins the process again by removing and replacing one or more of the symbols in the winning combination. This process may continue a predetermined number of times, for a predetermined period of time, or until there are no more winning combinations. In some embodiments, the player selects which symbols are to be removed.

In one example, a method of conducting a wagering game having a randomly selected outcome includes displaying a plurality of symbols in an array indicating the randomly selected outcome. In response to the randomly selected outcome including a winning symbol combination, less than all of the symbols that are a part of the winning symbol combination are removed and new symbols are added to the array into a position of the array vacated by the removed symbol.

Cascading at Least Some of the Winning Symbols

Figure 12:
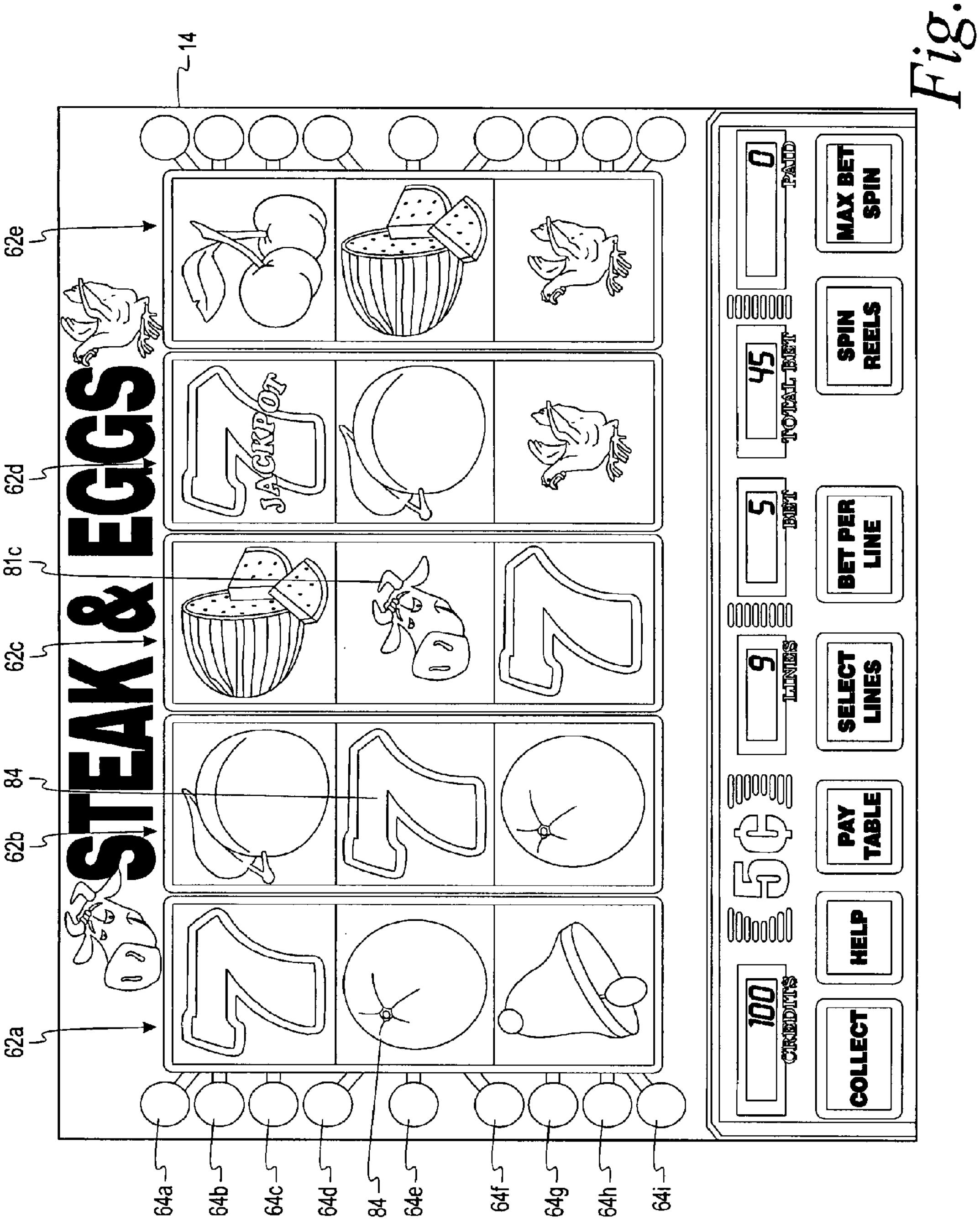
FIG. 12 is a display of a screen subsequent to FIG. 11.
Figure 13:
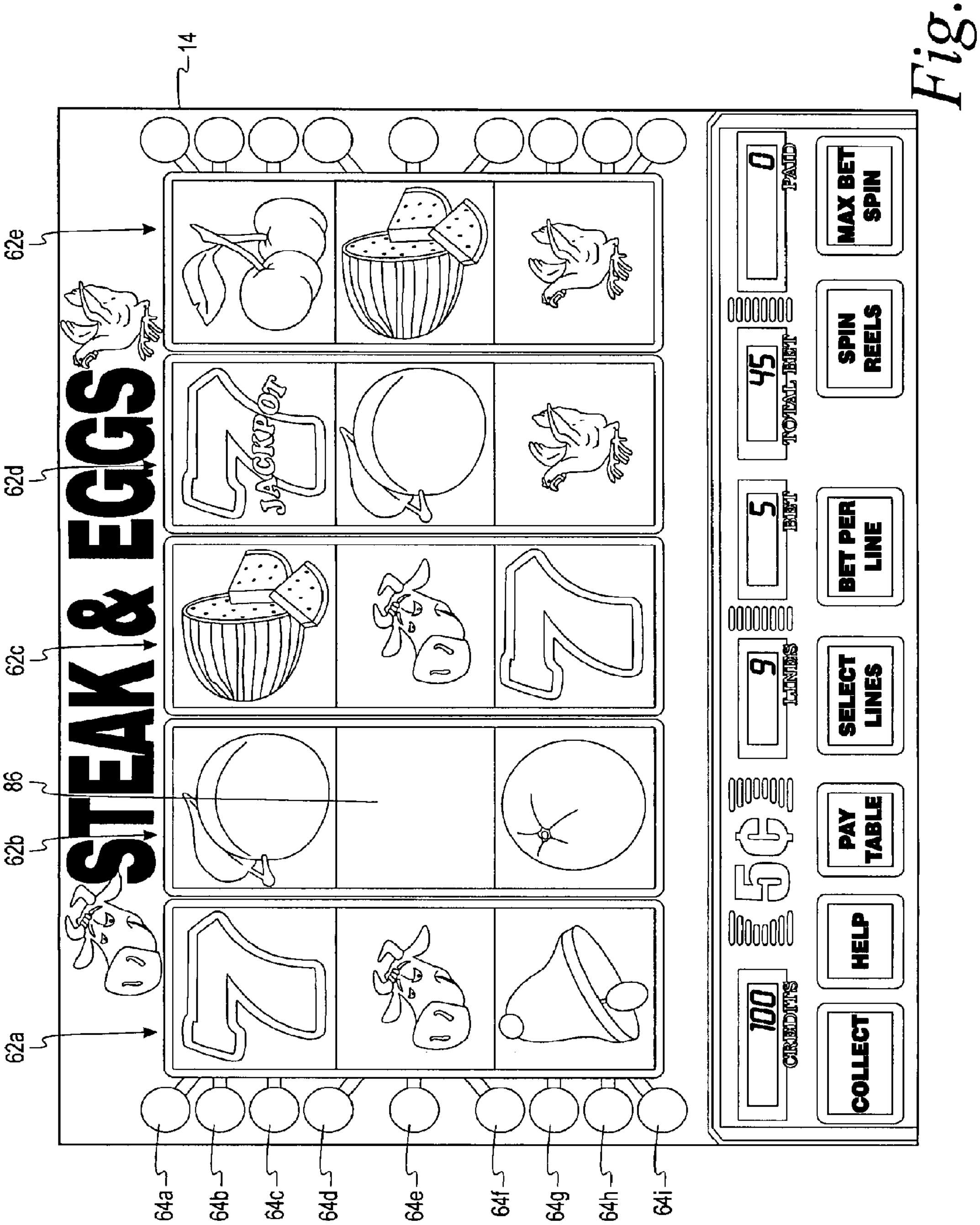
FIG. 13 is a display of a screen subsequent FIG. 10.
Figure 14:
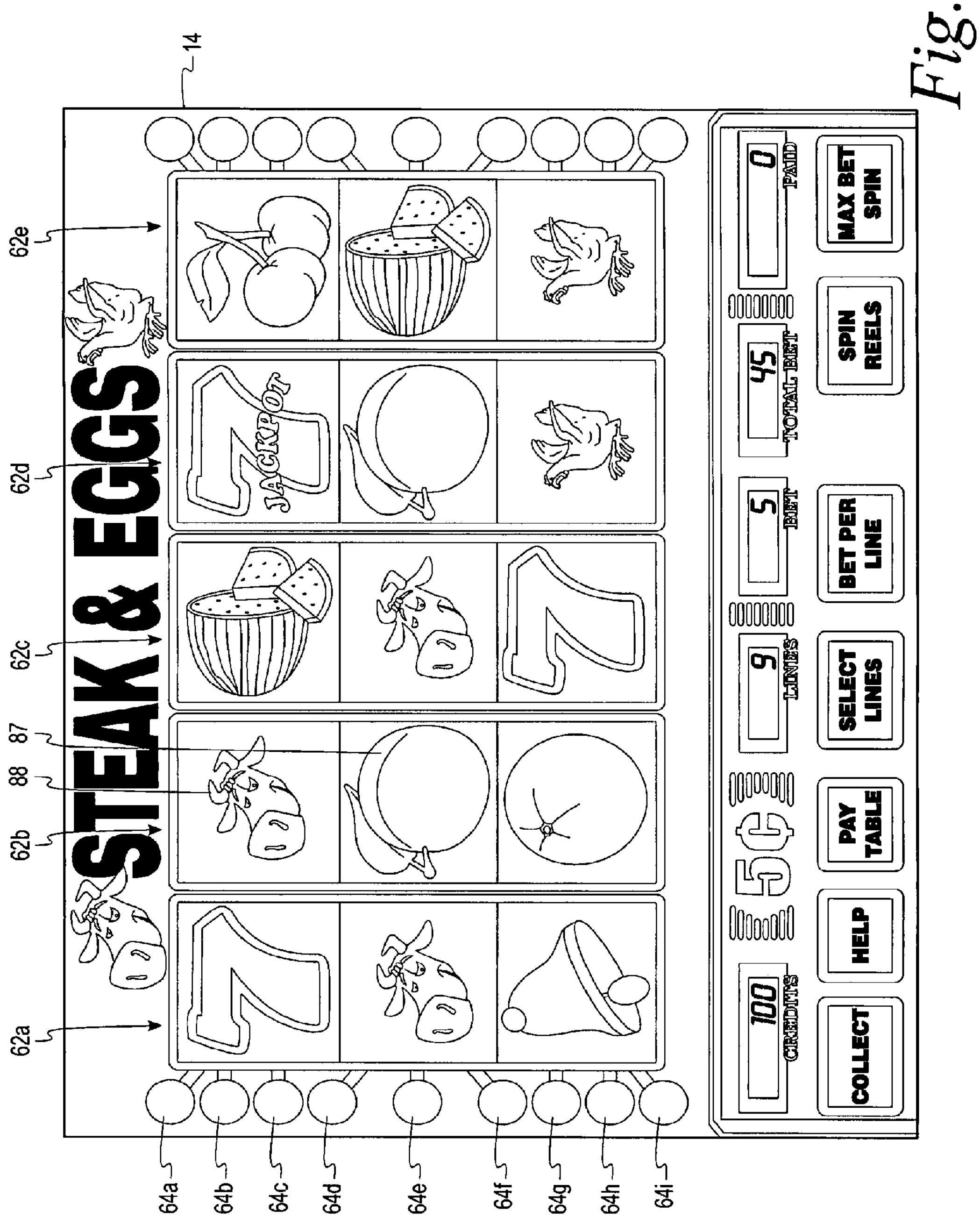
FIG. 14 is a display of a screen subsequent to FIG. 13.

FIG. 13 illustrates a variation of the embodiment described in FIGS. 10-12. In this embodiment, the player spins the reels and achieves the outcome displayed in FIG. 10. However, in this embodiment, instead of the removed winning symbols being replaced with new randomly selected symbols, the removed symbols trigger a cascade. In the embodiment illustrated in FIG. 13, one of the cow symbols **81*b* that was a part of the winning combination in FIG. 11 disappears, leaving a blank space 86. As shown in FIG. 14, the blank space 86 is filled as a peach symbol 87 cascades down from the position above, and the position vacated by the cascading peach symbol 87 is in turn filled by a randomly selected symbol, e.g., a cow symbol 88**, that enters from the top.

After the cascade, the gaming machine 10 awards the player for any new winning outcomes. If a new winning outcome is achieved, in some embodiments, the gaming machine 10 removes one or more of the symbols in the winning combination and cascades the symbols again. The cascading may continue a predetermined number of times, for a predetermined period of time, or until there are no more winning combinations. In some embodiments, the player selects which of the winning symbols are to be removed to trigger a cascade. In other embodiments, a controller selects which of the winning symbols are to be removed.

In one example, a method of conducting a wagering game having a randomly selected outcome includes displaying a plurality of symbols in an array indicating the randomly selected outcome. In response to the randomly selected outcome including a winning symbol combination, less than all of the symbols that are a part of the winning symbol combination are removed and other symbols are moved into a position of the array vacated by the removed symbol.

Cascading at Least Some of the Losing Symbols

Figure 15A:
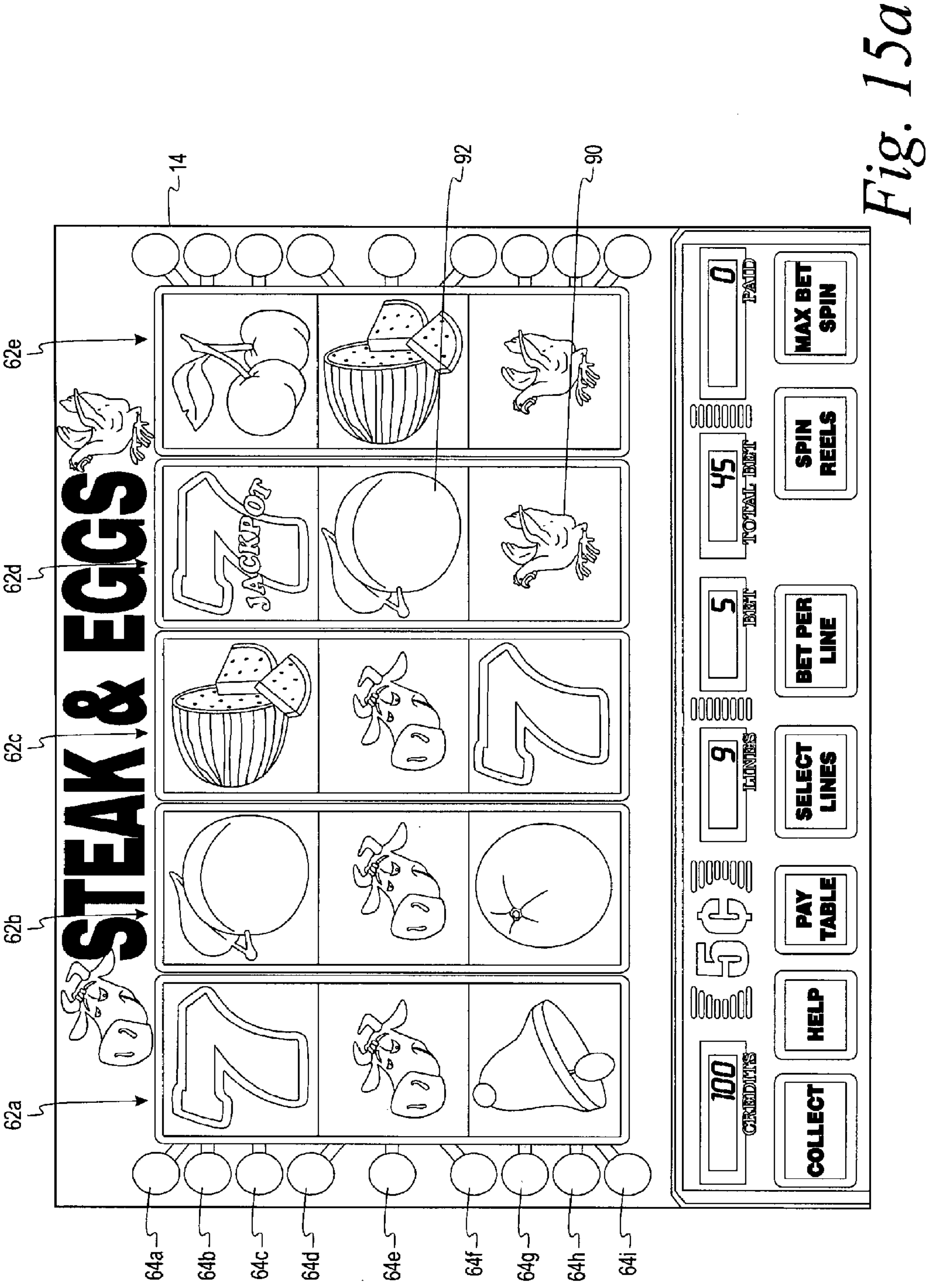
FIG. 15*a* is a display of a screen subsequent FIG. 10.
Figure 15B:
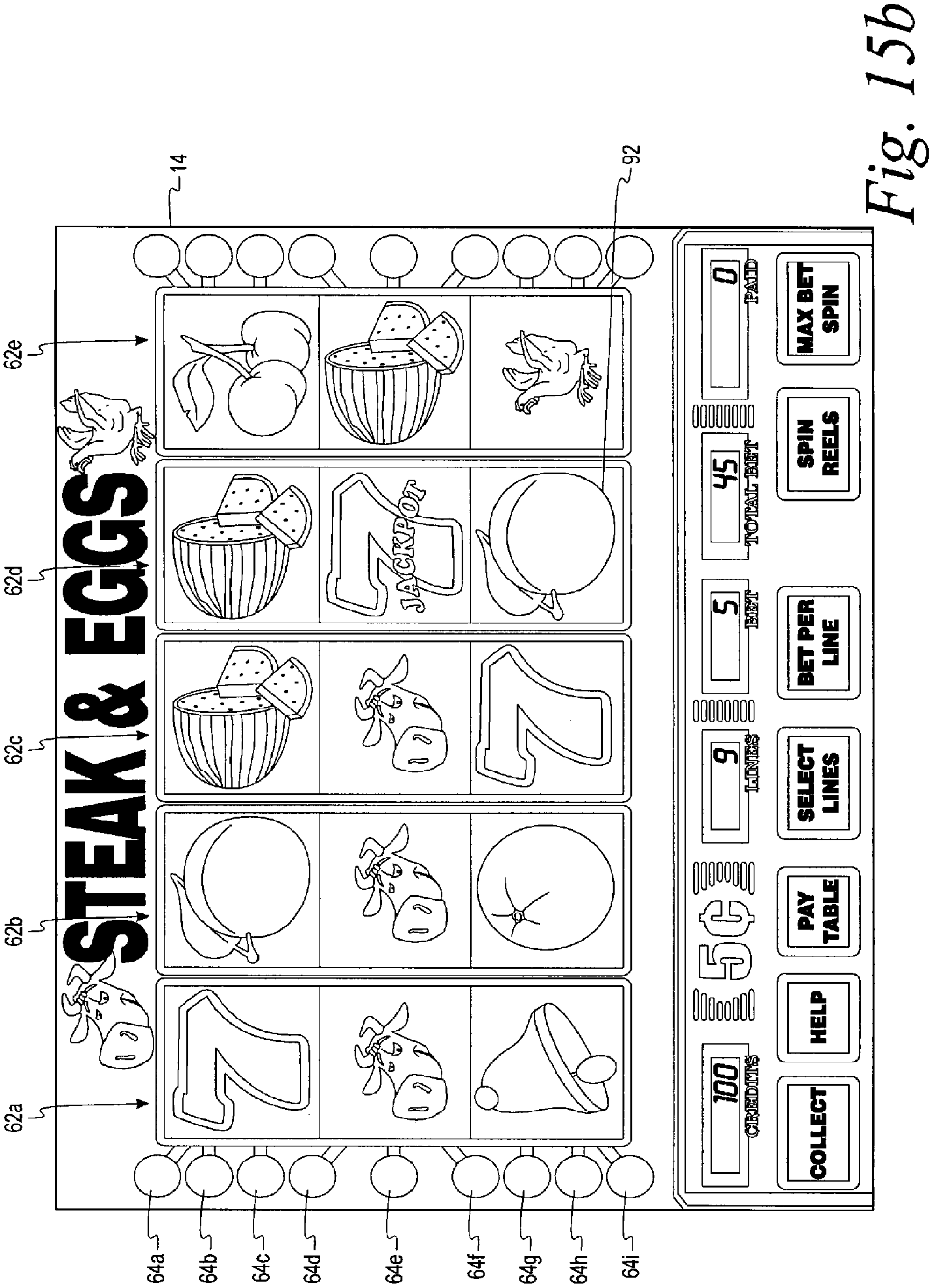
FIG. 15*b* is a display of a screen subsequent to FIG. 15*a*.

FIGS. **15*a* and 15*b* illustrate another embodiment of the present invention in which symbols that are not a part of the winning combination are removed and trigger a cascade. In this embodiment, as shown in FIG. 15*a*, a chicken symbol 90 in a bottom position disappears. As shown in FIG. 15*b*, the symbols above the disappearing chicken symbol 90 cascade down such that a peach symbol 92 from the middle row fills the position vacated by the chicken symbol 90, a jackpot seven symbol fills the position vacated by the cascading peach symbol 92**, and a randomly selected symbol, e.g., a watermelon symbol, enters from the top and fills the position vacated by the cascading jackpot seven symbol. After the cascade, the player is rewarded for any new winning combinations.

In some embodiments, the player will be paid again for the winning combination of the three cows along an active pay line. In some embodiments, the cascade may cause a winning combination that includes the old winning combination. For example, if the cascade of FIGS. **15*a* and 15*b*** caused a cow symbol to land in the middle row of the fourth column, the old winning combination of three cows would be transformed into a new winning combination of four cows. In such embodiments, the player would be awarded for the new winning combination.

In response to another winning combination being achieved as a result of the cascade (whether or not that winning combination includes symbols from the old winning combination), the gaming machine will award the player the prize that corresponds to that winning combination. In some embodiments, another non-winning symbol may be removed and causes another cascade. In other embodiments, the removal of non-winning symbols only occurs a predetermined number of times or for a predetermined amount of time. In some embodiments, the symbols may be removed and replaced with new symbols (similar to FIGS. 10 and 11 described above). Also, in some embodiments, the player is able to select which losing symbols cascade or are removed. In other embodiments, the controller selects which symbols are replaced or cascaded.

In one example, a method of conducting a wagering game having a randomly selected outcome includes displaying a plurality of symbols in an array indicating the randomly selected outcome. In response to the randomly selected outcome including a winning symbol combination, at least one symbol that is not a part of the winning symbol combination is removed and other symbols are moved into a position of the array vacated by the at least one removed symbol.

Character Removes Symbols

In yet other embodiments, the wagering game includes a character that removes random symbols from the displayed array after a winning combination is achieved. The symbols removed by the character may or may not be part of a winning combination. Once the symbols are removed, a cascade occurs. For example, after the winning combination is achieved, a boxer may come out and start punching symbols, causing them to disappear. In some embodiments, not all of the symbols the boxer punches may disappear. Some of them may require multiple punches or a particular type of punch to disappear and cause a cascade. In other embodiments, a golfer could come out and hit golf balls at symbols to get them to disappear or switch locations with another symbol. Alternatively, it could be a baseball player who hits balls at the symbols. In other embodiments, the character may be related to the theme of the game.

In one example, a method of conducting a wagering game having a randomly selected outcome includes displaying a plurality of symbols in an array indicating the randomly selected outcome. In response to the randomly selected outcome including a winning symbol combination, at least one symbol is removed and other symbols are moved into a position of the array vacated by the at least one removed symbol. A character is displayed and removes the at least one symbol.

Symbols Change State and are Eventually Removed

Figure 16:
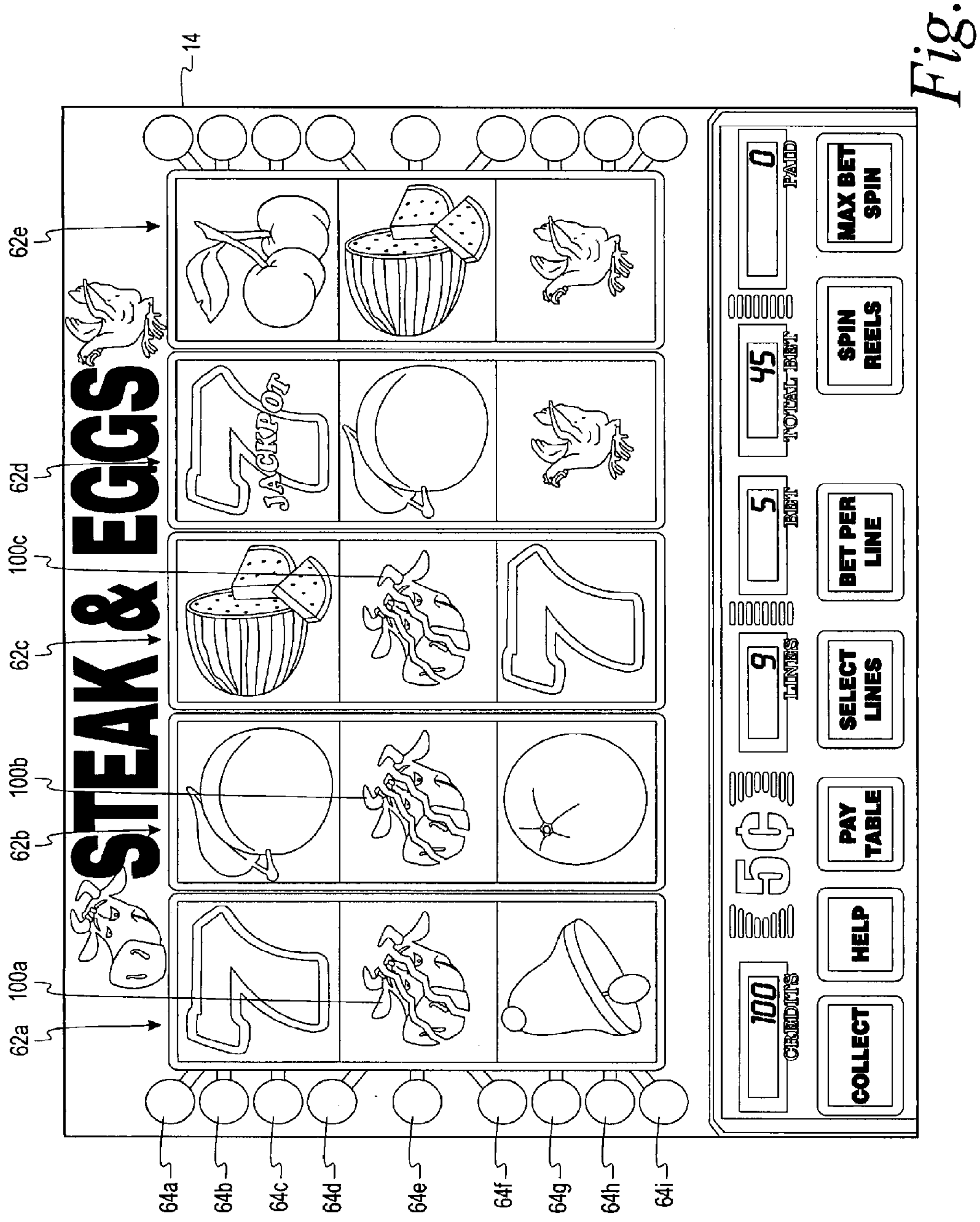
FIG. 16 is a display of a screen subsequent to FIG. 10.
Figure 17:
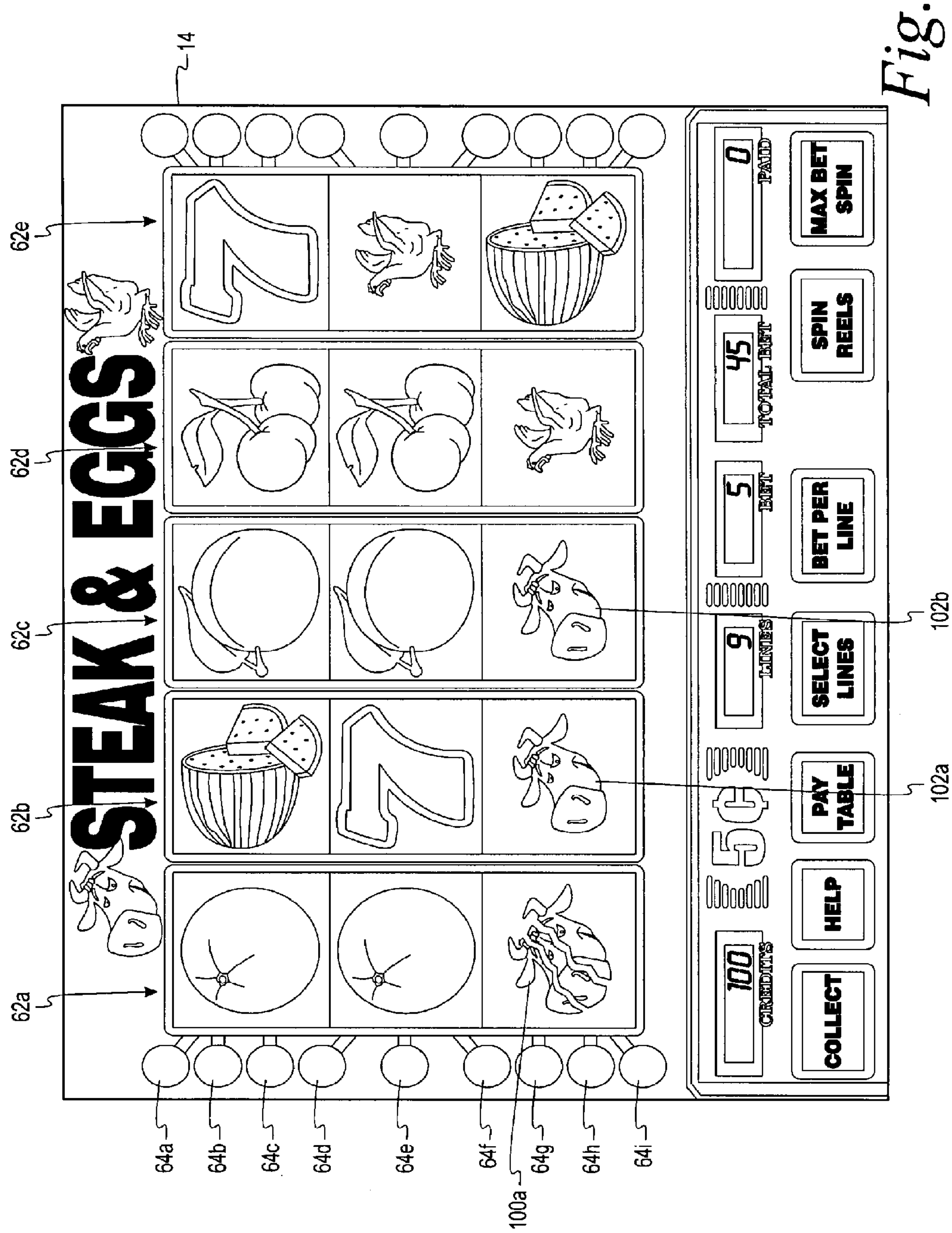
FIG. 17 is a display of a screen subsequent to FIG. 16.

In another embodiment of the present invention, the symbols that are in the winning combination do not disappear, but change from an initial state to an intermediate state the first time the symbol is a part of a winning combination. Once the symbol is in the intermediate state, it is more "fragile" and more likely to enter a removable state and be removed in subsequent spins, causing a cascade. In the result illustrated in FIG. 10, the three cow symbols 81*a*, 81*b*, 81*c* create a winning combination. However, in this embodiment, the cow symbols 81*a*, 81*b*, 81*c* do not disappear, but instead "crack" as shown in FIG. 16, creating cracked cow symbols 100*a*, 100*b*, 100*c*. The player then spins the reels 62*a*-62*e* again. This time, as shown in FIG. 17, one of the cracked cow symbols 100*a* appears in the bottom row. Two other non-cracked cow symbols 102*a*, 102*b* also appear in the bottom row, creating a winning combination.

In some embodiments, the other two non-cracked cow symbols 102*a*, 102*b* may then crack. If there are any new winning outcomes, the player is awarded a corresponding winning award. In some embodiments, symbols that make up a part of the new winning combination may crack. In other embodiments, only symbols that are a part of the first winning combination crack.

Figure 18:
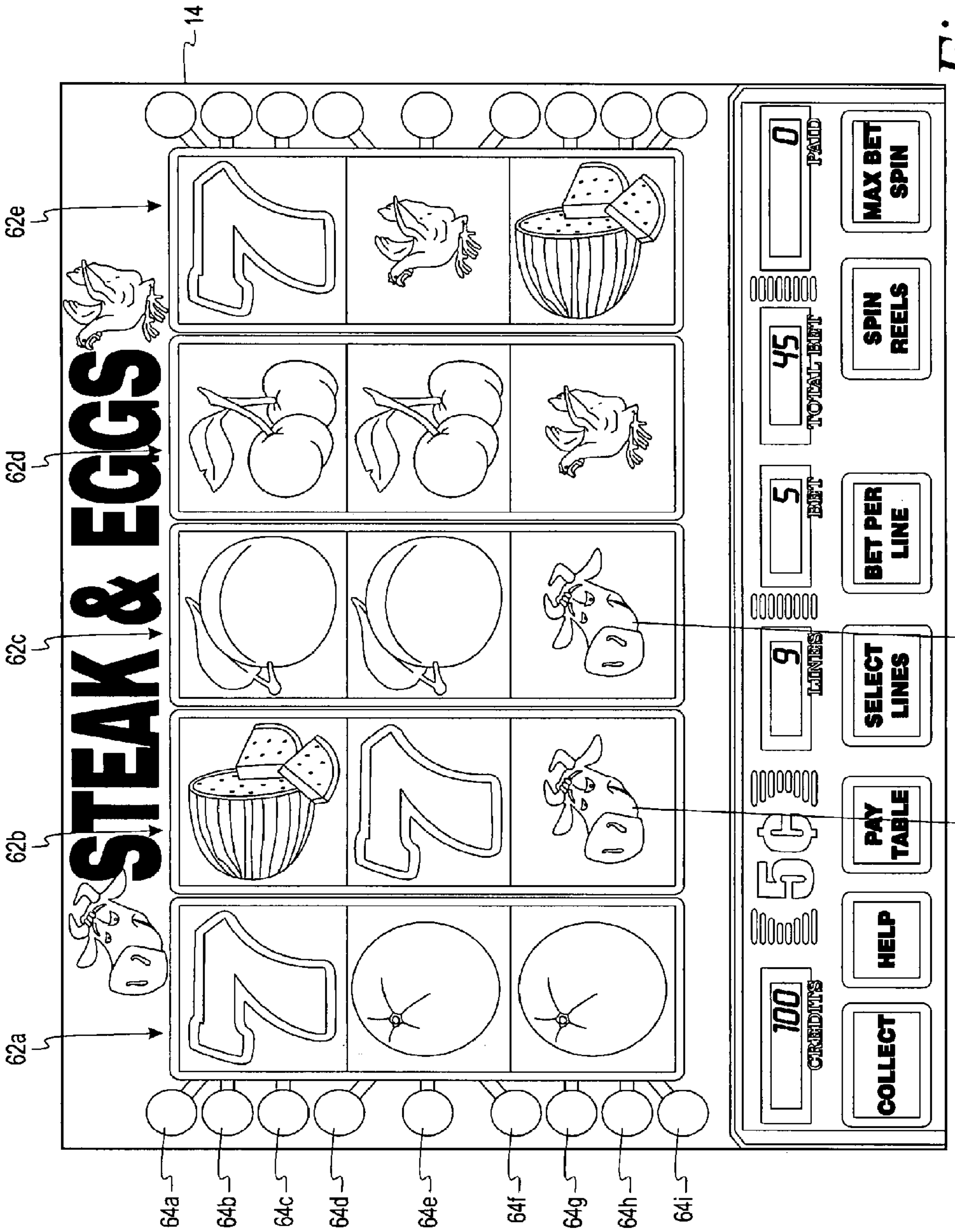
FIG. 18 is a display of a screen subsequent to FIG. 17.

As shown in FIG. 18, once the cracked cow symbol 100*a* is a part of a second winning combination, the cracked cow symbol 100*a* disappears and the symbols above the cracked cow symbol 100*a* cascade down into the position vacated by the cracked cow symbol 100*a*. In some embodiments, the symbols may need to be a part of multiple winning combinations before disappearing. For example, the cracked cow symbol 100*a* of FIG. 18 may not disappear, but may crack even further. Then, the third time the cracked cow symbol 100*a* is part of a winning combination, the cracked cow symbol 100*a* will disappear and cause a cascade.

In the above-described embodiments, the symbols have a plurality of "states" (e.g., initial, intermediate, removable). Once a predetermined criterion is met, symbols are advanced through the plurality of states. After a symbol has advanced through each of the plurality of states, the symbol is then removed from the primary display 14, causing a cascade to occur. While FIGS. 16-18 illustrate an embodiment where the predetermined criterion is the symbol being part of a winning symbol combination, the predetermined criterion may include, but is not limited to: the location of a symbol within a particular cell in the array; the symbol landing on a particular pay line; the symbol being near, or adjacent to, a "state-altering" symbol in the array; the player placing a side wager and the symbol landing on a pay line on the primary display 14; the symbol being on the primary display 14 a predetermined number of times during a single play; the symbol being on the primary display a predetermined number of times during multiple plays; and the symbol being part of predetermined non-winning symbol combination.

As an example of a predetermined criterion being the symbol being near or adjacent to a "state-altering" symbol in the array, the symbols could be cracked by various simulated "disasters" that occur on the primary display 14 (e.g., volcanic eruption, thunderstorm, and earthquake) in response to the symbols being near a volcano symbol, lightening bolt symbol, etc. . . . In some embodiments, the location of the symbol in the array may affect how much the symbol cracks, or how much it is damaged. For example, a symbol next to a "volcano" symbol may suffer large cracks, while a symbol that is two symbols away from the "volcano" symbol may only suffer minor cracks.

As an example of the predetermined criteria being the location of a symbol within a particular cell in the array, only symbols in certain cells of the array crack. These cells may be considered "danger areas" or "danger zones." Symbols that land in the "danger zone" may bulge, indicating that they will crack if part of a winning combination.

In some embodiments, the predetermined criterion that causes a symbol to transition from the initial state to the intermediate state may be different than the predetermined criterion that causes a symbol to transition from the intermediate state to the removable state. For example, a symbol may be cracked by a simulated natural disaster as described above (the first predetermined criterion), but the symbol may only be removed once the symbol is part of a winning symbol combination (the second predetermined criterion).

In some embodiments, there may be a plurality of gaming machines 10 connected in a bank. A predetermined criterion that occurs at one of the gaming machines 10 may cause symbols at the other, linked gaming machines 10 to also crack or become damaged. For example, if a volcano erupts on one of the gaming machines 10, symbols may crack or become damaged on all of the gaming machines 10 in the bank.

Alternatively, the bank of gaming machines can have signage and if one of the predetermined criteria occurs on the signage (e.g., the signage shows a volcanic eruption), all of the gaming machines 10 may have symbols that become damaged.

In one example, a method of conducting a wagering game includes displaying a plurality of symbols in an array indicating a randomly selected outcome. At least one symbol is in an initial state. In response to a first predetermined criterion being met during a first play of the wagering game, the at least one symbol in the array transitions from the initial state to an intermediate state. In response to a second predetermined criterion being met during a subsequent play of the wagering game, the at least one symbol in the array transitions from the intermediate state to a removable state. The at least one symbol is removed from the array.

Symbols Slide

Returning again to FIG. 10, a winning combination of three cow symbols 81*a*, 81*b*, 81*c* is illustrated. Once a winning combination is achieved (either before or after the player is granted the corresponding award), one of the rows containing a symbol of the winning combination slides horizontally, creating a horizontal cascade.

Figure 19:
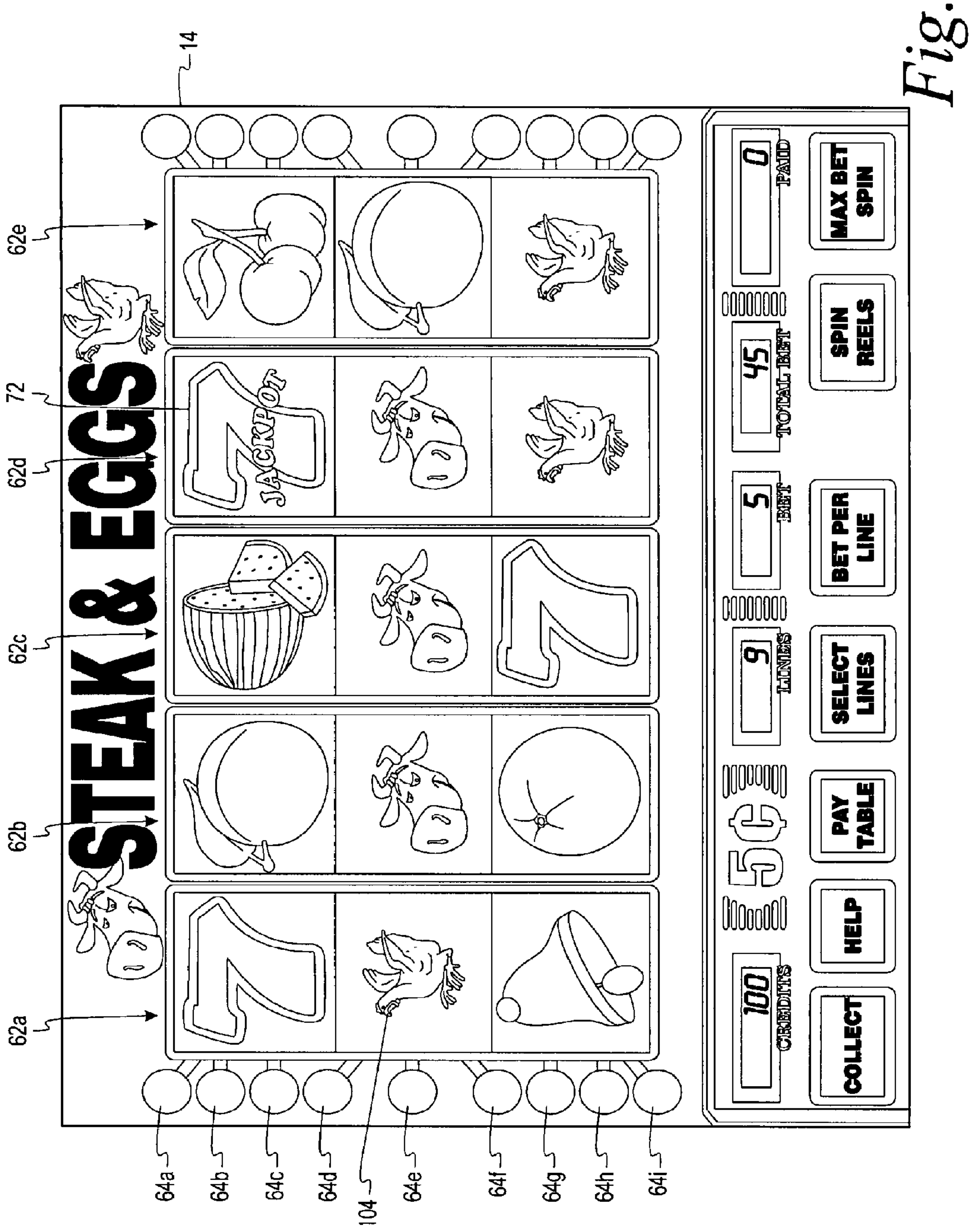
FIG. 19 is a display of a screen subsequent to FIG. 10.

As shown in FIG. 19, the middle row slides or shifts to the right, causing a rightmost watermelon symbol to disappear. A new randomly selected symbol, e.g., a chicken symbol 104, enters from the left and fills the vacated position on the first reel 62*a*. If there are any additional winning combinations, the player is awarded a corresponding award and a row containing a symbol of the winning combination is then moved. If the winning combination is in more than one row, either all of the rows having a symbol in the winning combination may be shifted, or less than all of the rows may be shifted. If less than all of the rows are shifted, the row(s) to be shifted may be selected randomly or according to a set of rules.

In one example, a method of conducting a wagering game having a randomly selected outcome includes displaying a plurality of symbols in an array indicating the randomly selected outcome. In response to the randomly selected outcome including a winning symbol combination, a row of the array including a symbol that is a part of the winning symbol combination is slid and other symbols are added into a position of the array vacated by the sliding row.

Multi-Sided Symbols

Figure 20:
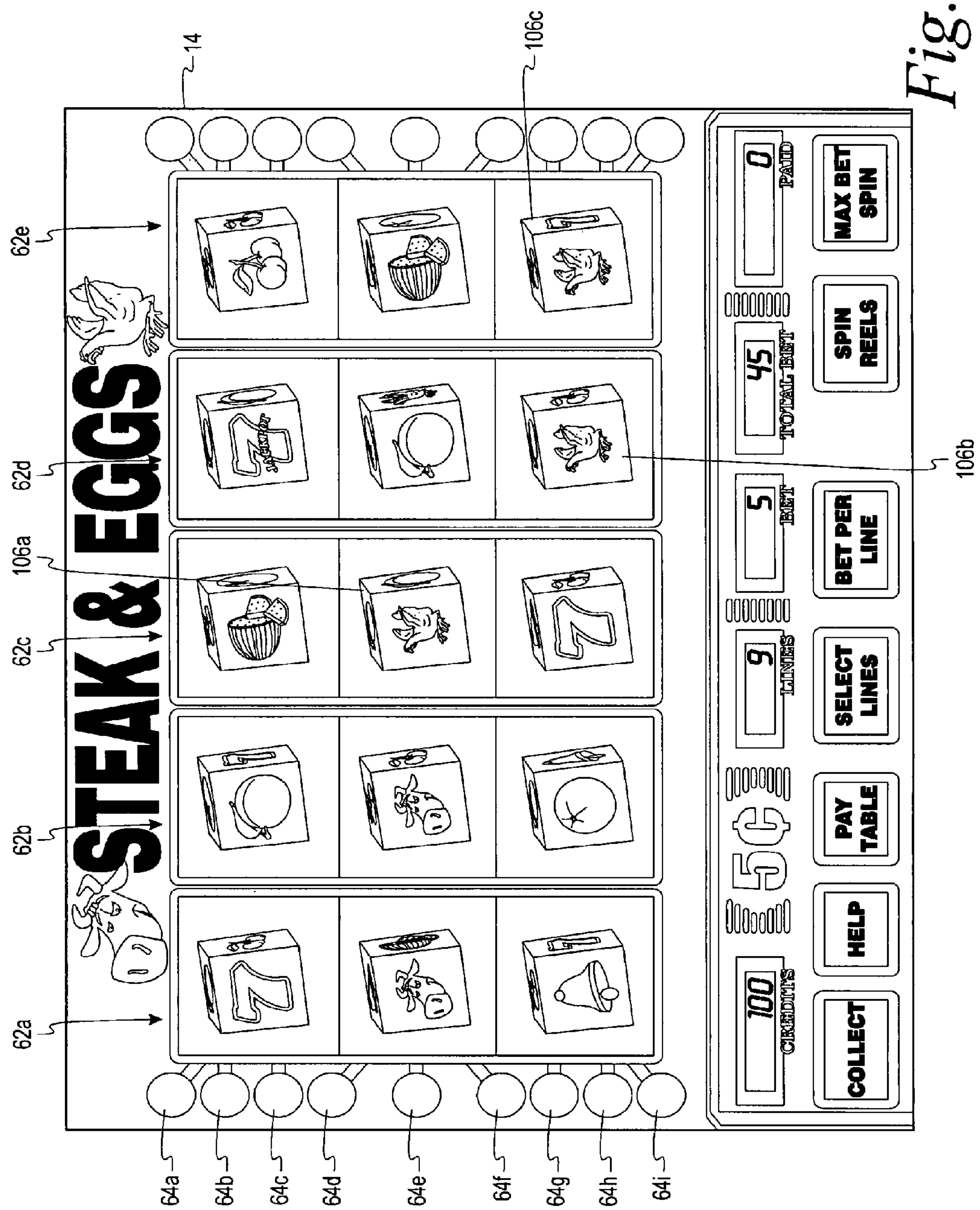
FIG. 20 is a display of an initial basic game screen according to one embodiment of the present invention.
Figure 21:
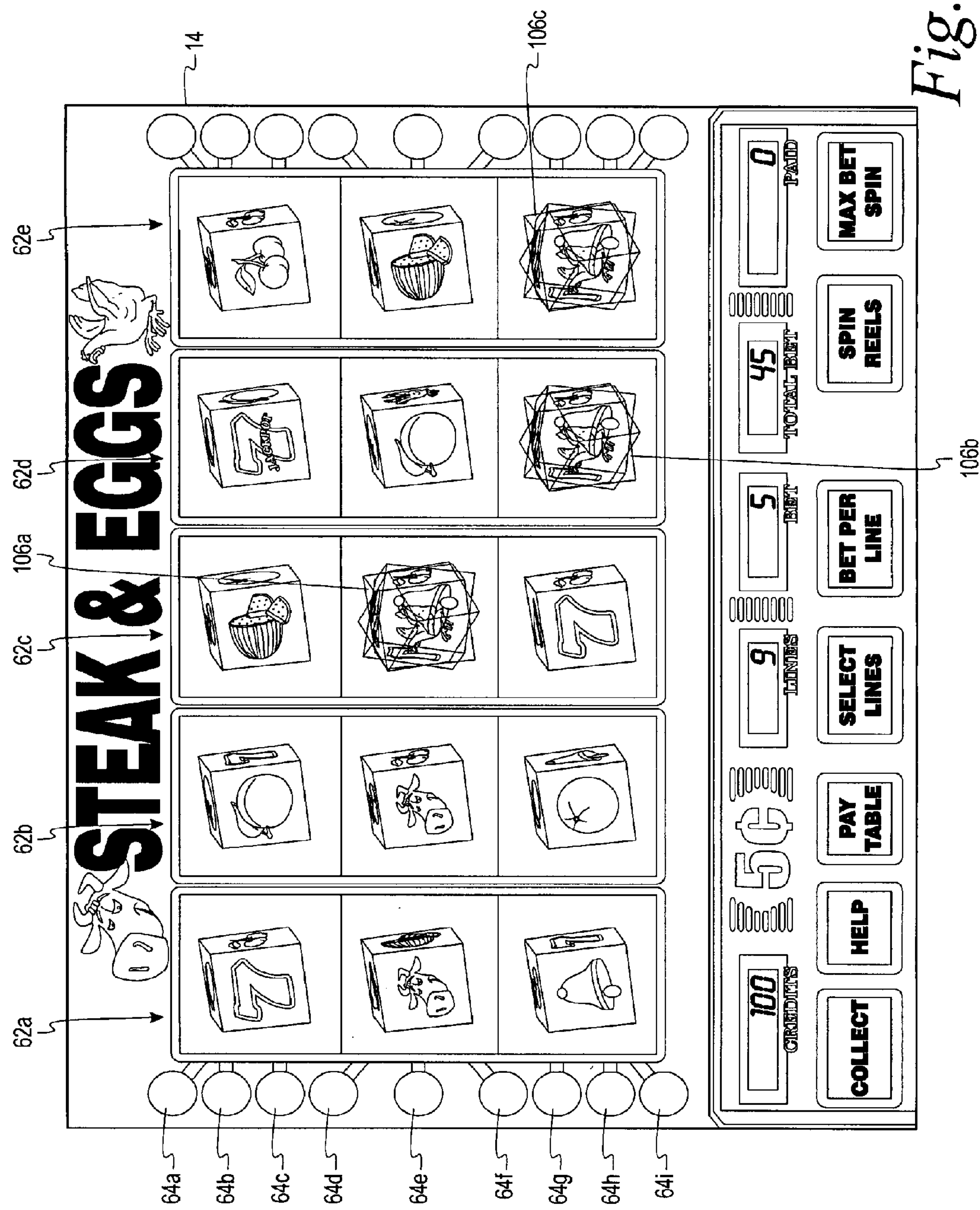
FIG. 21 is a display of a screen subsequent to FIG. 20.
Figure 22:
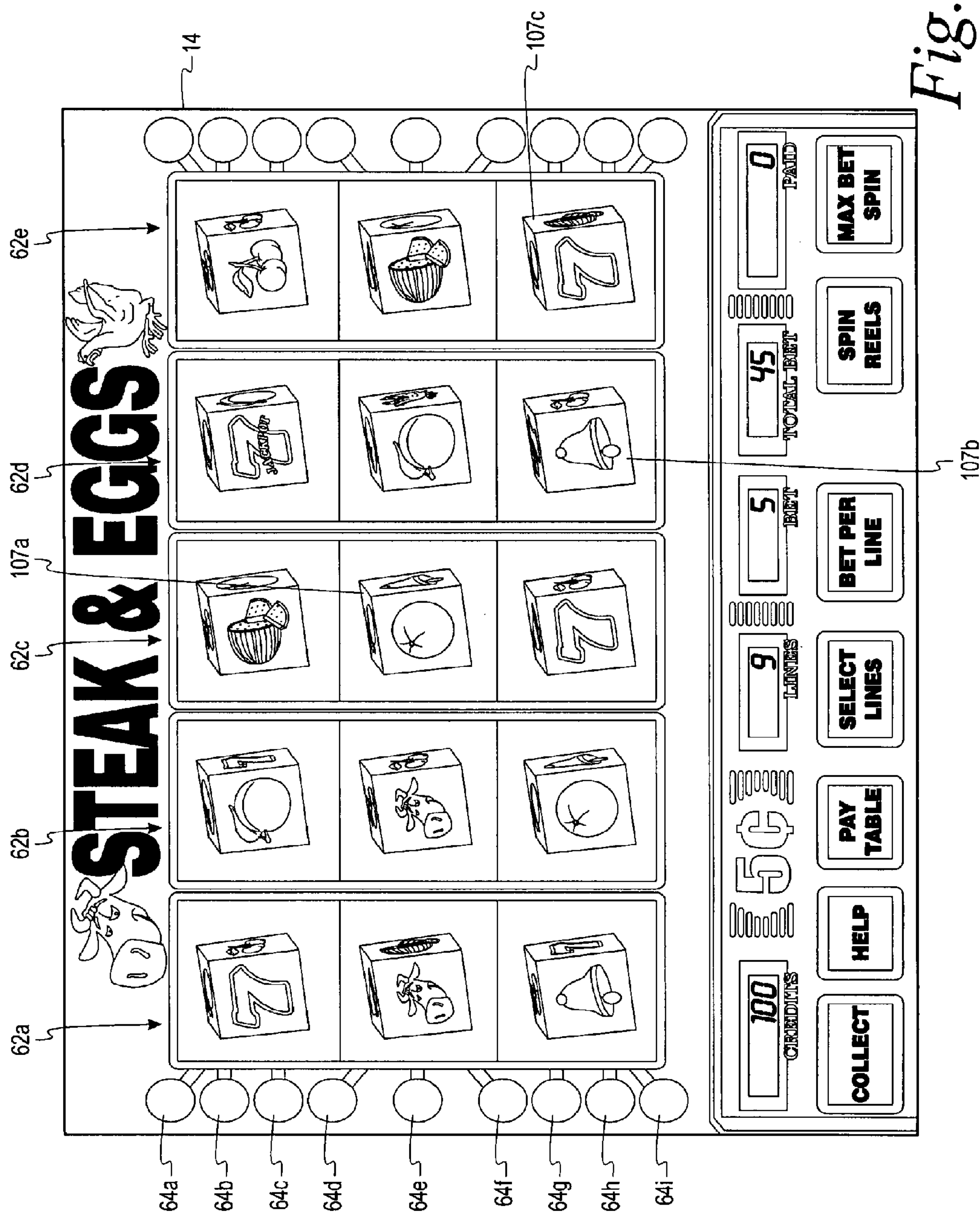
FIG. 22 is a display of a screen subsequent to FIG. 21.

Turning now to FIG. 20, an alternative embodiment of the present invention is described below. In this embodiment, each of the symbols on the primary display 14 is a multi-sided symbol, such as a die. As shown in FIG. 20, the combination of three chicken symbols 106*a*, 106*b*, 106*c* creates a right-to-left winning combination. After the player is granted an award for the winning combination, the symbols of the winning combination begin to spin (FIG. 21). As shown in FIG. 22, the spinning symbols stop on new symbols 107*a*, 107*b*, 107*c*, and the player is provided with an award for any new winning combinations. Should new winning combinations exist, the symbols that are a part of the new winning combinations may also spin. In other embodiments, the symbols only spin once.

In some embodiments, once a symbol is part of a winning combination, that symbol may disappear from the die. The die keeps spinning until all of the symbols on the die have disappeared.

In one example, a method of conducting a wagering game having a randomly selected outcome includes displaying a plurality of symbols in an array indicating the randomly selected outcome. Each of the plurality of symbols is located on a multi-sided die and each multi-sided die has a symbol on each side. In response to the randomly selected outcome including a winning symbol combination, each of the multi-sided dice that are a part of the winning symbol combination is rotated to display a new side of the die, creating a new array.

Multiple Symbols in a Single Reel Position

Figure 23:
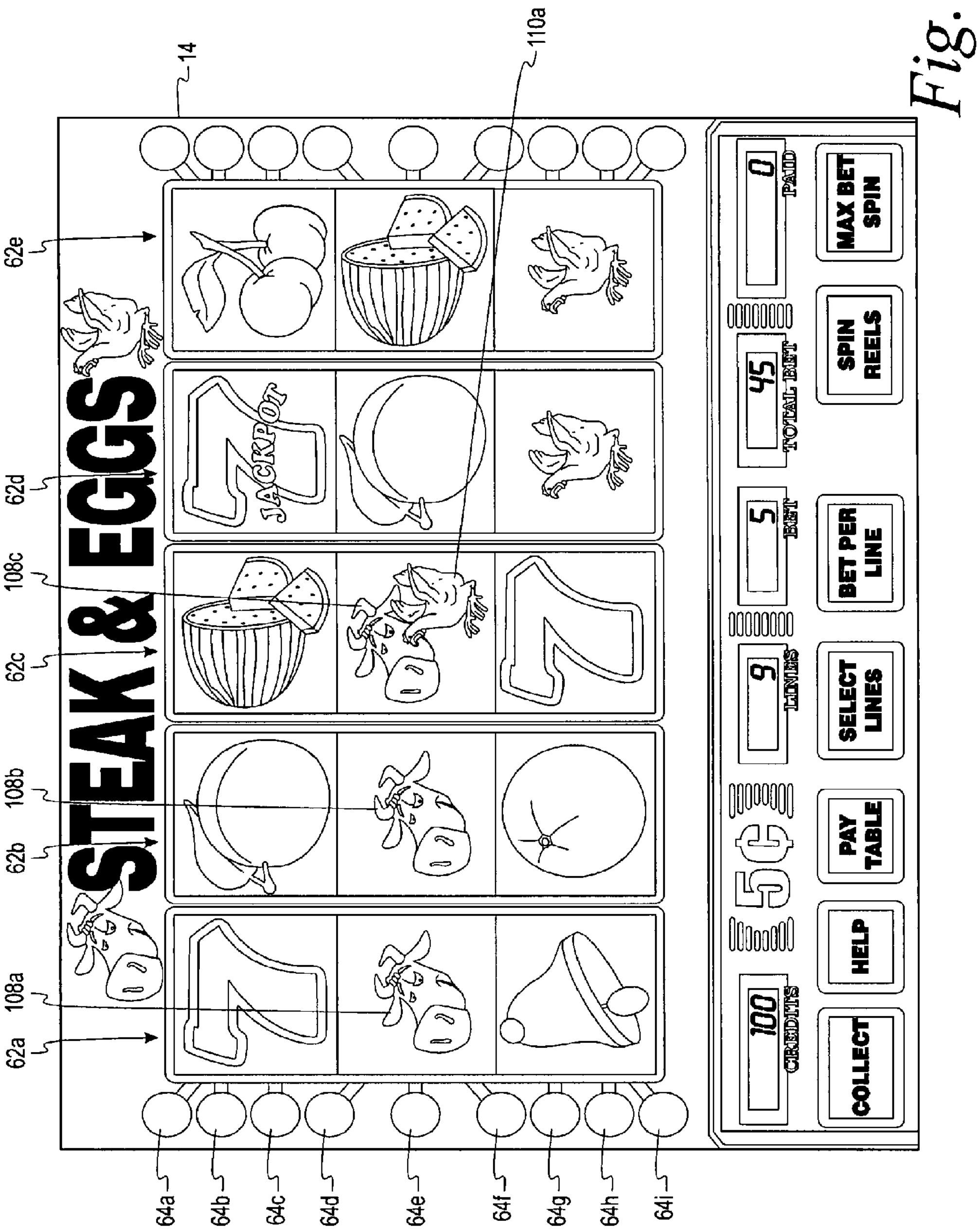
FIG. 23 is a display of an initial basic game screen according to one embodiment of the present invention.
Figure 24:
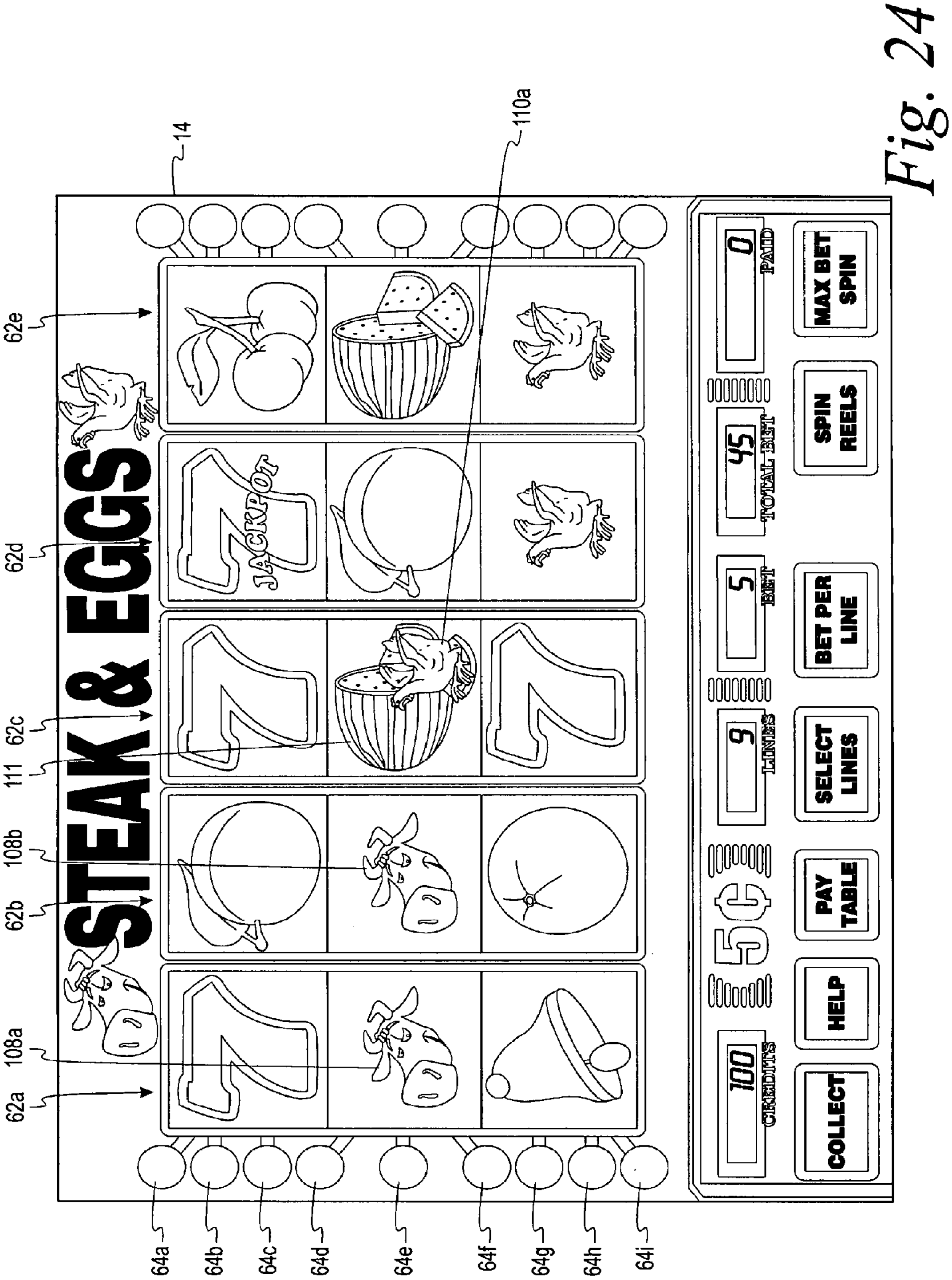
FIG. 24 is a display of a screen subsequent to FIG. 23.

Turning now to FIG. 23, a reel spin result is shown that includes three cow symbols 108*a*, 108*b*, 108*c* forming a winning combination. The reel spin result also includes a chicken symbol 110*a* overlaying one of the cow symbols 108*c*. The cow symbol 108*c* disappears, leaving only the chicken symbol 110*a*. As shown in FIG. 24, a watermelon symbol 111 above the chicken symbol 110*a* cascades into the cell with the chicken symbol 110*a* (but the chicken 110*a* stays in place). The symbol above the watermelon symbol 111 drops into the position vacated by the watermelon symbol 111. The gaming machine 10 rewards the player for any new winning combinations.

In some embodiments, instead of having multiple symbols overlay one another, there can be a single traditional symbol with a background color behind the symbol. After the symbol is a part of a winning combination, the background color stays and the symbol cascades. The background colors may enhance the awards granted to the player (or may cause different winning combinations).

Other embodiments include gemstones in jewelry. If the gemstone/jewelry combination is part of a winning combination, one portion will disappear, causing a cascade. For example, if a diamond ring is part of a winning combination, the diamond from the ring would disappear, and the gemstones from the jewelry in the cells above would cascade down (but the jewelry would stay in place). Alternatively, the gemstones could stay in the same cells and the jewelry could disappear and cascade into the stationary jewelry (or vice versa).

In one example, a method of conducting a wagering game having a randomly selected outcome includes displaying a plurality of symbols in an array indicating the randomly selected outcome and a first symbol and a second symbol occupying a single position in the array. In response to the randomly selected outcome including a winning symbol combination, one of the first symbol and second symbol is removed and other symbols are moved into a position of the array vacated by the removed symbol.

Blank Reel Symbols

Figure 25:
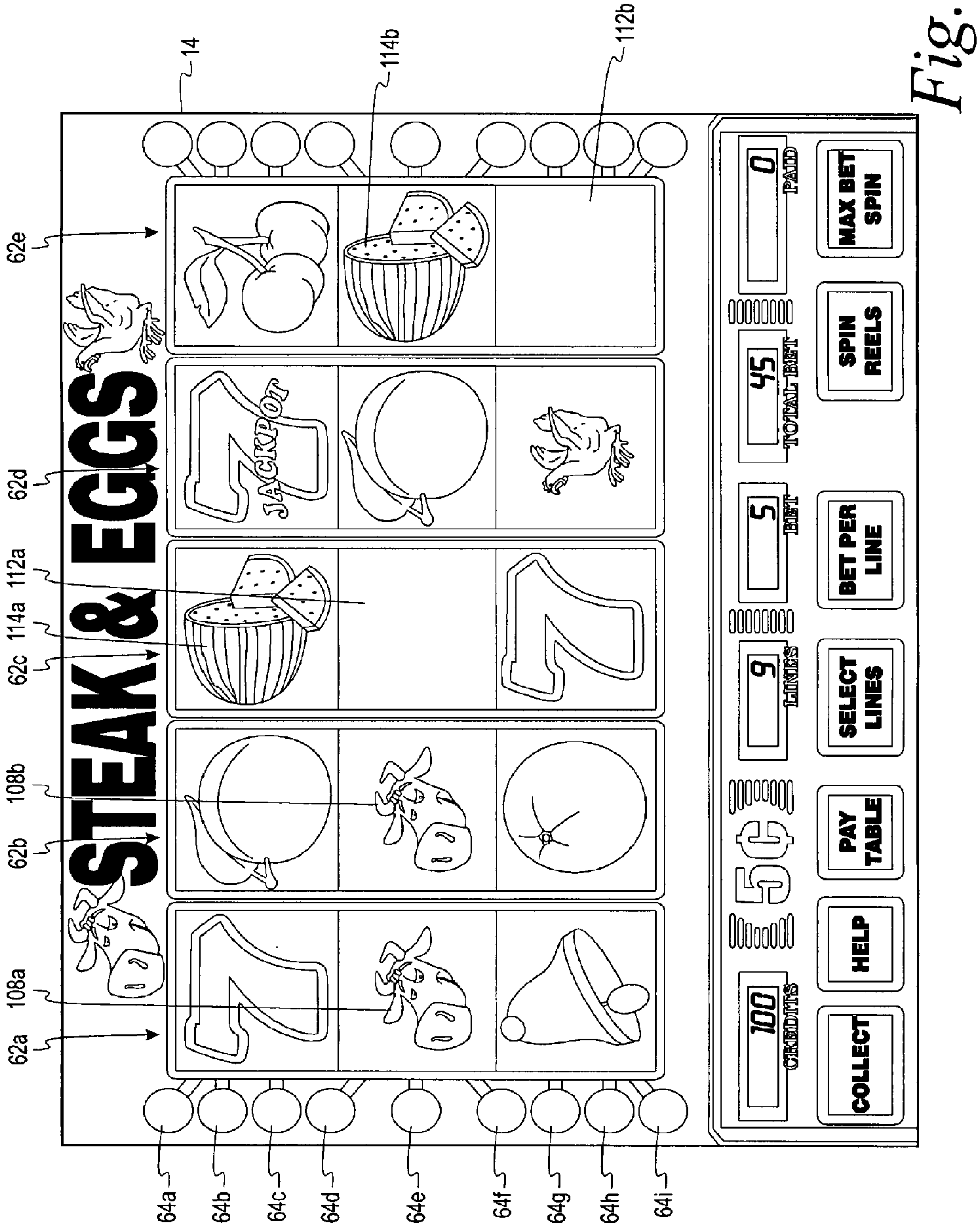
FIG. 25 is a display of a screen subsequent to FIG. 23.
Figure 26:
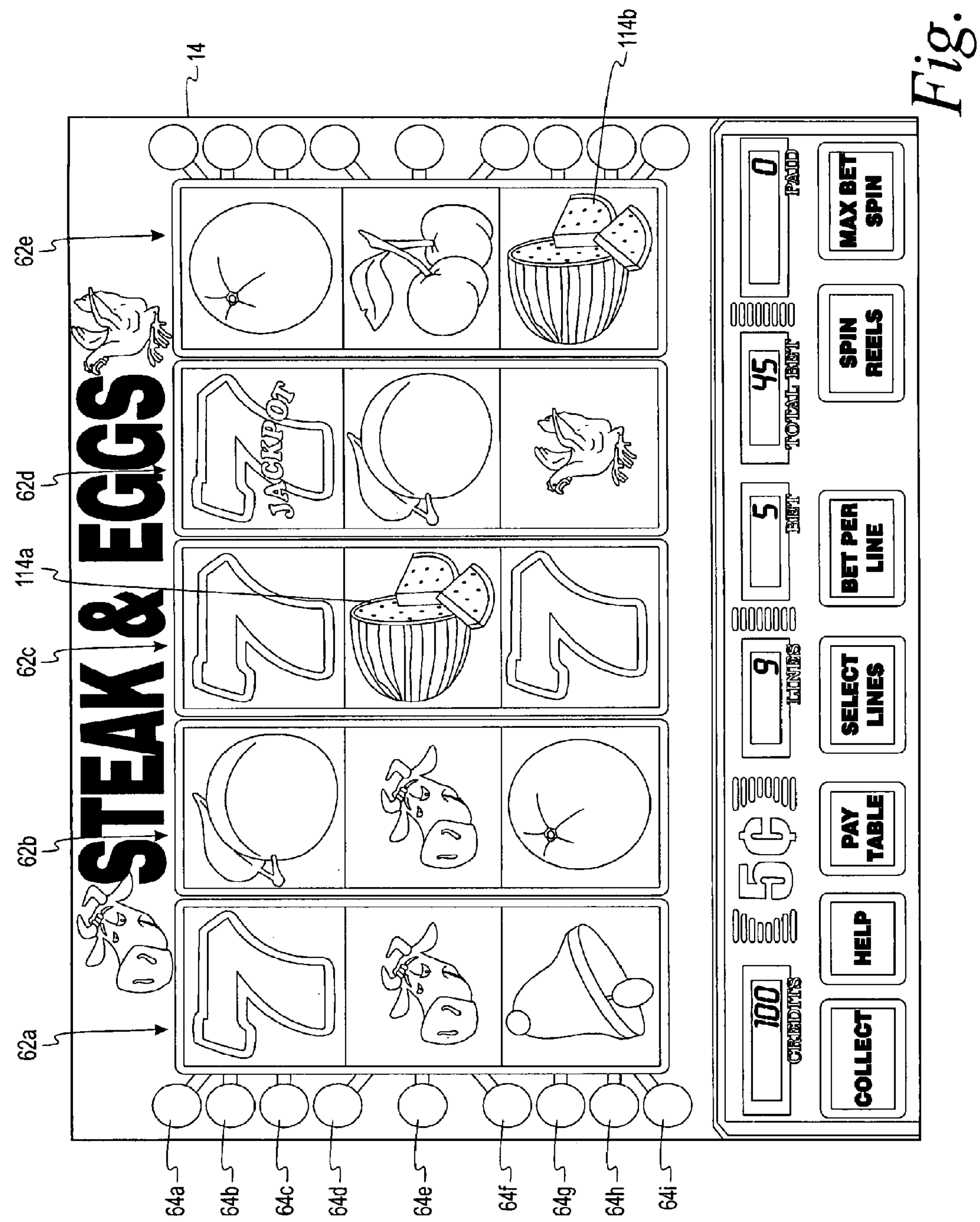
FIG. 26 is a display of a screen subsequent to FIG. 25.

Turning now to FIG. 25, another embodiment of the present invention is described below. In this embodiment, there may be symbols that are a remove-symbol type that are always removed from the array. In the illustrated embodiment of FIG. 25, the remove-symbol type symbols are blank symbols 112*a*, 112*b* on the display after a reel spin. After rewarding the player for any winning combinations, the symbols above the blank symbols, e.g., the watermelon symbols 114*a*, 114*b* in the illustrated embodiment, cascade down into the positions occupied by the blanks, and symbols, e.g., a seven symbol and an orange symbol, enter from the top to replenish the array. The outcome of this cascading action is shown in FIG. 26. The player is then rewarded for any new winning combinations. In other embodiments, the symbols may not be blank, but instead may be a dedicated symbol that does not pay, but disappears after appearing in the array, causing a cascade.

In one example, a method of conducting a wagering game having a randomly selected outcome includes displaying a plurality of symbols in an array indicating the randomly selected outcome. In response to the randomly selected outcome including a winning symbol combination, at least one symbol that is not a part of the winning symbol combination is removed and other symbols are moved into a position of the array vacated by the at least one removed symbol. The at least one removed symbol is a remove-symbol type that is always removed in response to the winning outcome being achieved.

Cascade Locationally Mirrored Symbols

Figure 27:
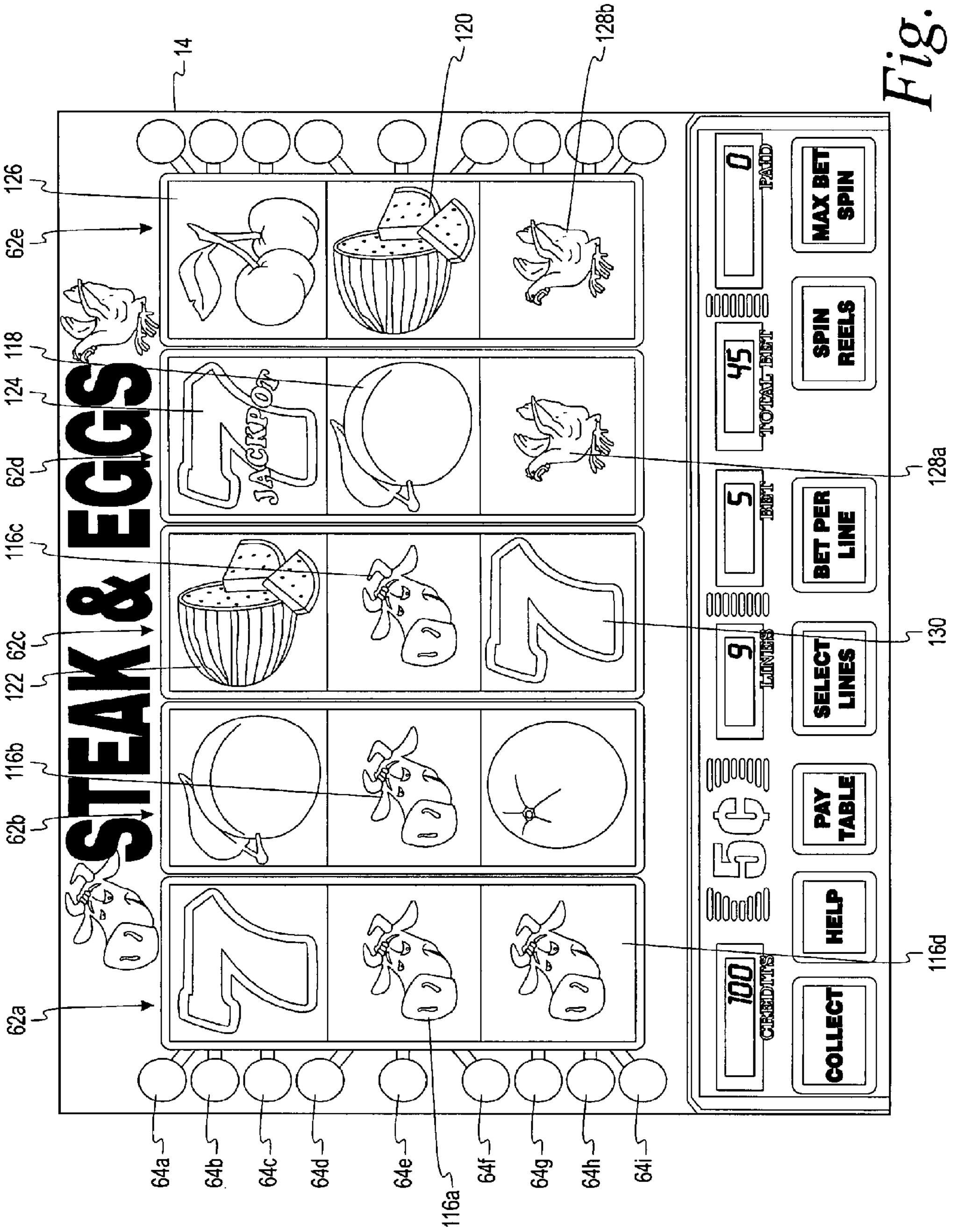
FIG. 27 is a display of an initial basic game screen according to another embodiment of the present invention.
Figure 28:
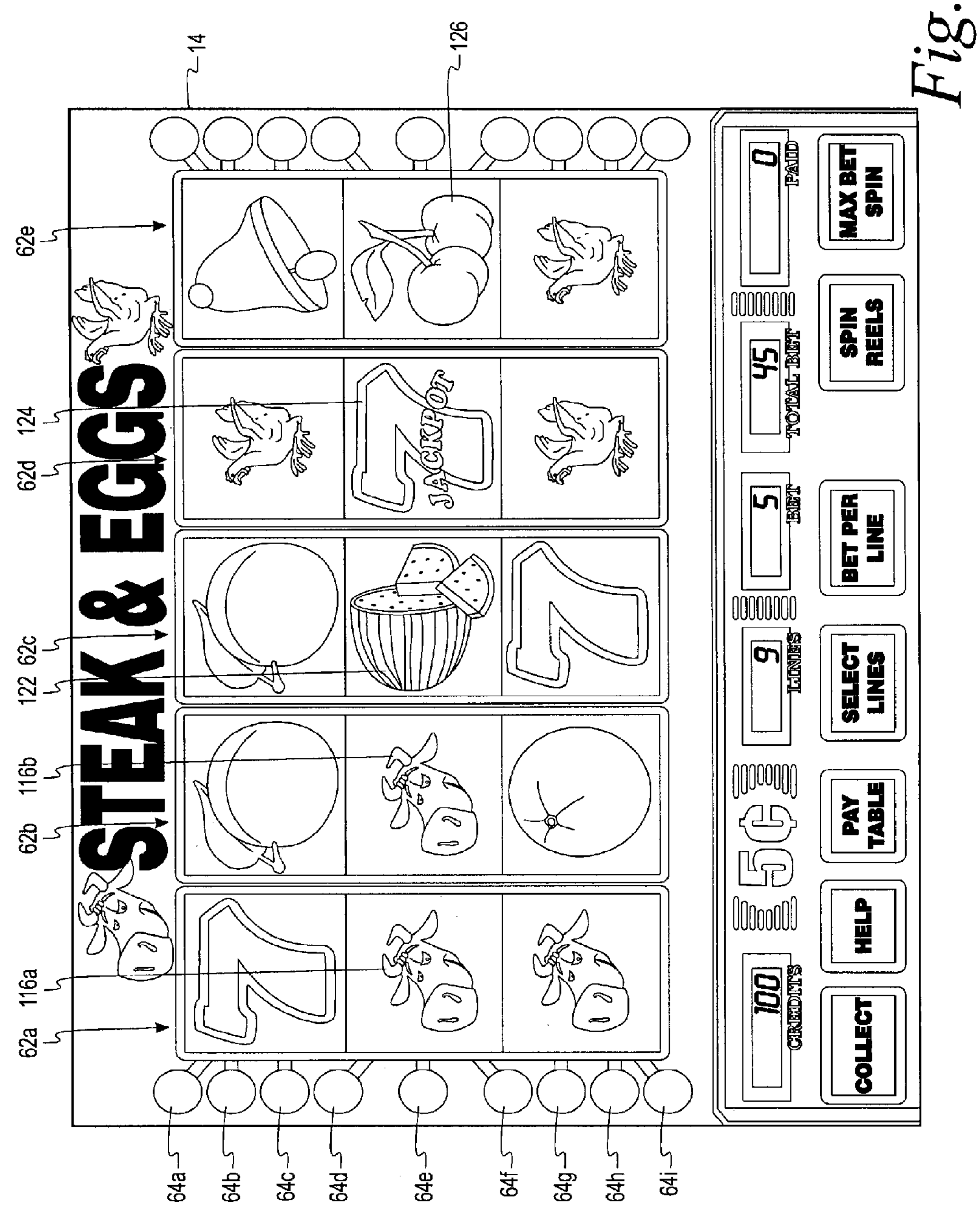
FIG. 28 is a display of a screen subsequent to FIG. 27.

Turning now to FIG. 27, another embodiment of the present invention utilizing cascading symbols is illustrated. In this embodiment, once a winning combination is achieved, the winning symbols do not cascade, but instead, symbols in locations that horizontally mirror the locations of the winning symbols trigger a cascade. In the illustrated embodiment, three cow symbols 116*a*, 116*b*, 116*c* create a winning combination. However, those symbols do not disappear and cascade; instead, the symbols in locations that horizontally mirror the locations of those symbols in the display (cow symbol 116*c*, peach symbol 118, and watermelon symbol 120) disappear, causing a cascade. As shown in FIG. 28, a watermelon symbol 122 replaces the cow symbol 116*c*, a seven symbol 124 replaces the peach symbol 118 and a cherry symbol 126 replaces the watermelon symbol 120. Symbols enter from the top to replenish the array. The player is then rewarded for any new winning combinations. In some embodiments, if there are any new winning combinations, then there are additional cascades. In other embodiments, the cascade may only occur once, for a predetermined number of times, or for a predetermined amount of time.

In one example, a method of conducting a wagering game having a randomly selected outcome includes displaying a plurality of symbols in an array indicating the randomly selected outcome. In response to the randomly selected outcome including a winning symbol combination, at least one symbol that is not a part of the winning symbol combination is removed and other symbols are moved into a position of the array vacated by the at least one removed symbol. The at least one removed symbol is a symbol that locationally mirrors a symbol in the winning symbol combination.

Cascade Paired Symbols

Figure 29:
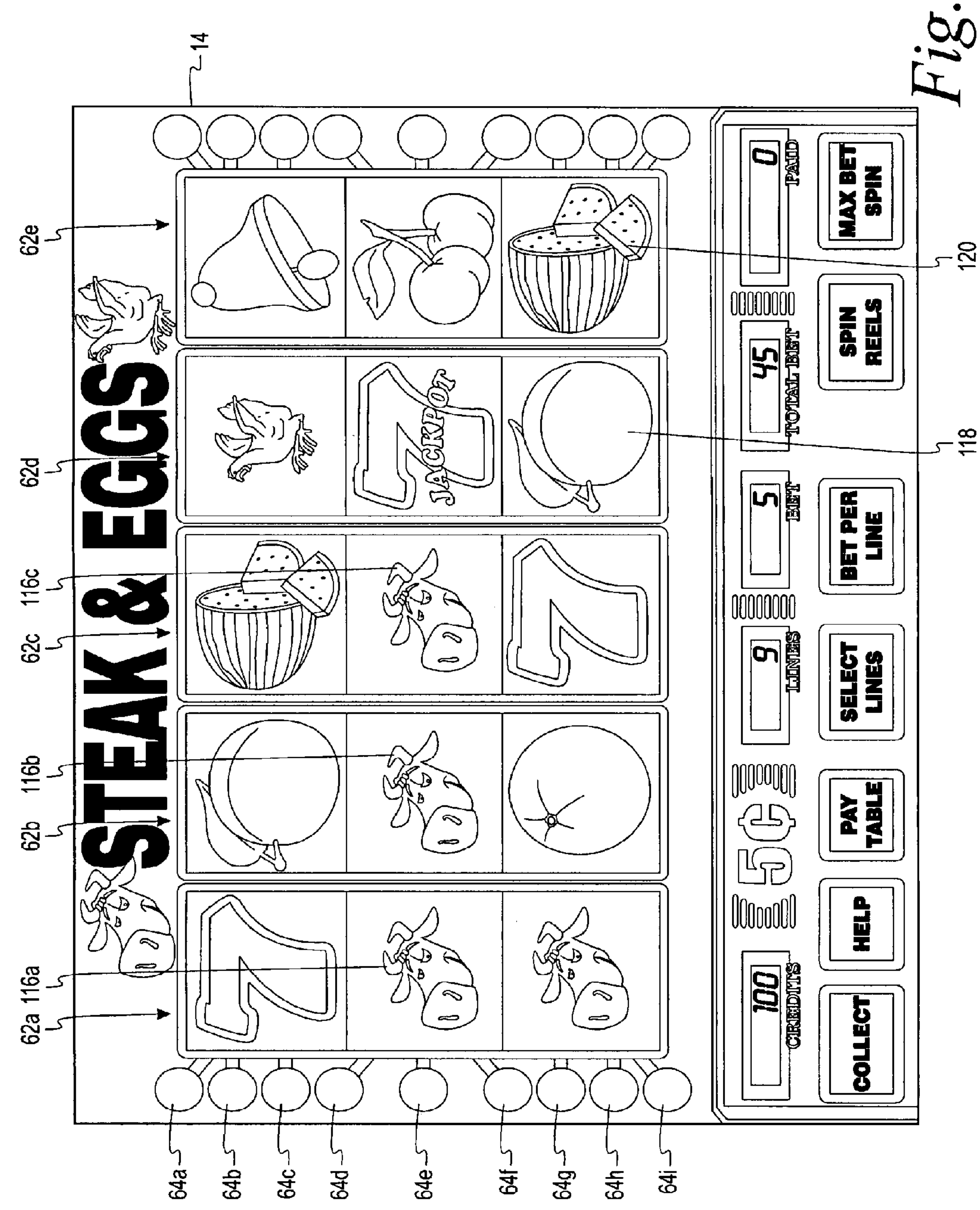
FIG. 29 is a display of a screen subsequent to FIG. 27.

Returning to FIG. 27, another variation of the mirror cascade is described below. In this embodiment, the three cow symbols 116*a*, 116*b*, 116*c* still create a winning combination. In this embodiment, symbols that are the opposite of or correspond to the symbols in the winning combination disappear and trigger a cascade. A pay table (not shown) may indicate to the player which symbols correspond to other symbols. In the present embodiment, the opposite symbol for the "cow" symbol is the "chicken" symbol. Thus, all appearances of the "chicken" symbol anywhere in the primary display 14 disappear (in FIG. 27, chicken symbols 128*a*, 128*b*). As shown in FIG. 29, the chicken symbols have disappeared, causing the cascade (peach symbol 118 and watermelon symbol 120 have replaced the chicken symbols 128*a*, 128*b*). The player is then rewarded for any new winning combinations. In some embodiments, the original winning combination may pay out again. In other embodiments, each combination may pay out only once and the player may only be granted awards for new winning combinations.

In one example, a method of conducting a wagering game having a randomly selected outcome includes displaying a plurality of symbols in an array indicating the randomly selected outcome. In response to the randomly selected outcome including a winning symbol combination, at least one symbol that is not a part of the winning symbol combination is removed and other symbols are moved into a position of the array vacated by the at least one removed symbol. The at least one removed symbol is of a type that corresponds to a type of symbol in the winning symbol combination.

Random Symbols to Cascade

Figure 30:
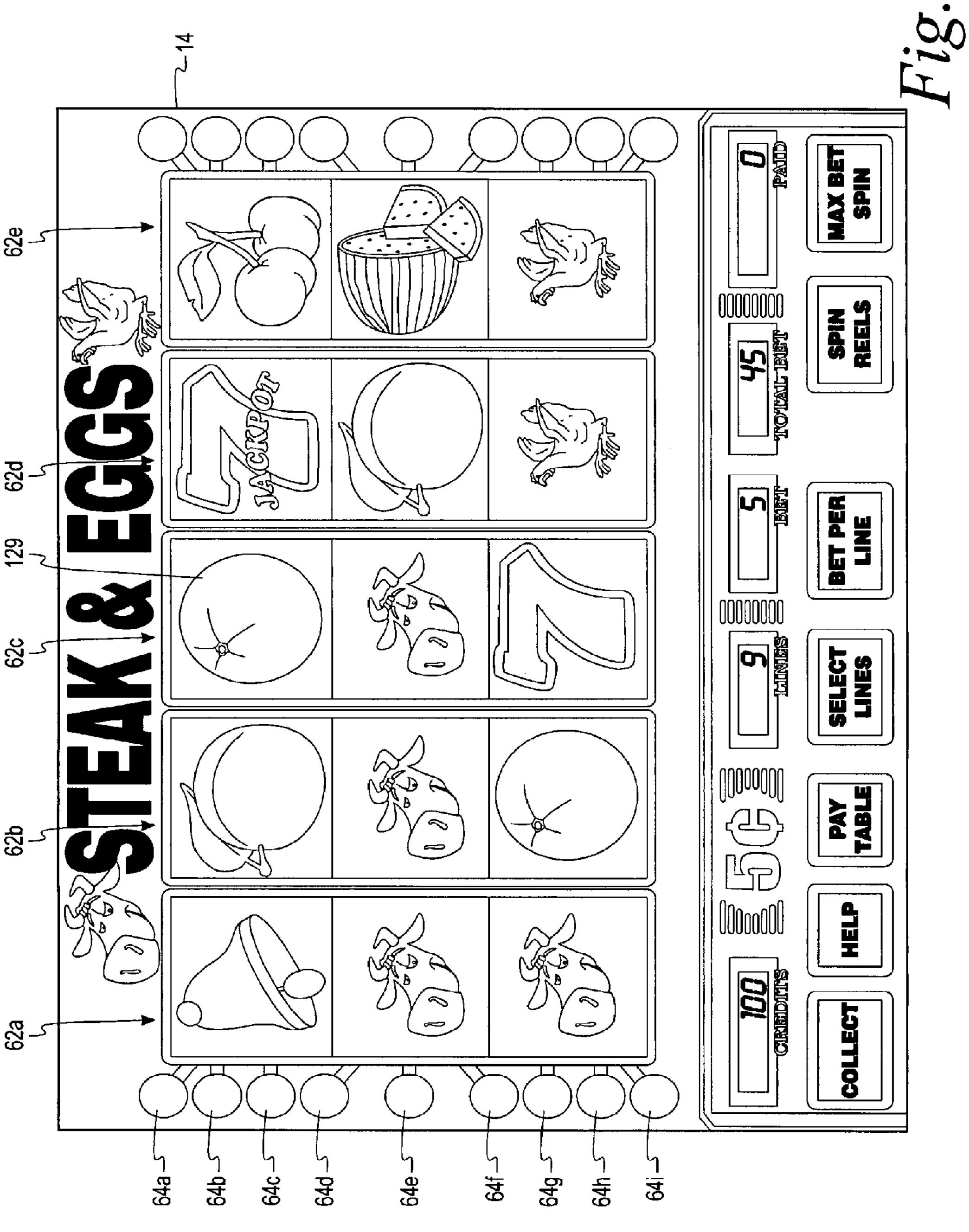
FIG. 30 is a display of a screen subsequent to FIG. 27.

In another embodiment, random symbols may cascade. If a player achieves the outcome of FIG. 27 with the three winning cow symbols 116*a*, 116*b*, 116*c*, randomly selected symbols may disappear and cause a cascade. In the embodiment illustrated in FIGS. 27 and 30, the watermelon symbol 122 disappears, causing a cascade, and is replaced by an orange symbol 129. The player is then rewarded for any winning combinations. In some embodiments, if the original winning combination is still present after the cascade, the player may be rewarded again. In other embodiments, the player will only be rewarded once for each winning combination. The randomly selected symbols that disappear may be any symbols in the array (including winning symbols) and any number of them may disappear and trigger cascades.

In one example, a method of conducting a wagering game having a randomly selected outcome includes displaying a plurality of symbols in an array indicating the randomly selected outcome. In response to the randomly selected outcome including a winning symbol combination, at least one symbol is randomly removed and other symbols are moved into a position of the array vacated by the at least one removed symbol.

Shaped Cascade

Figure 31:
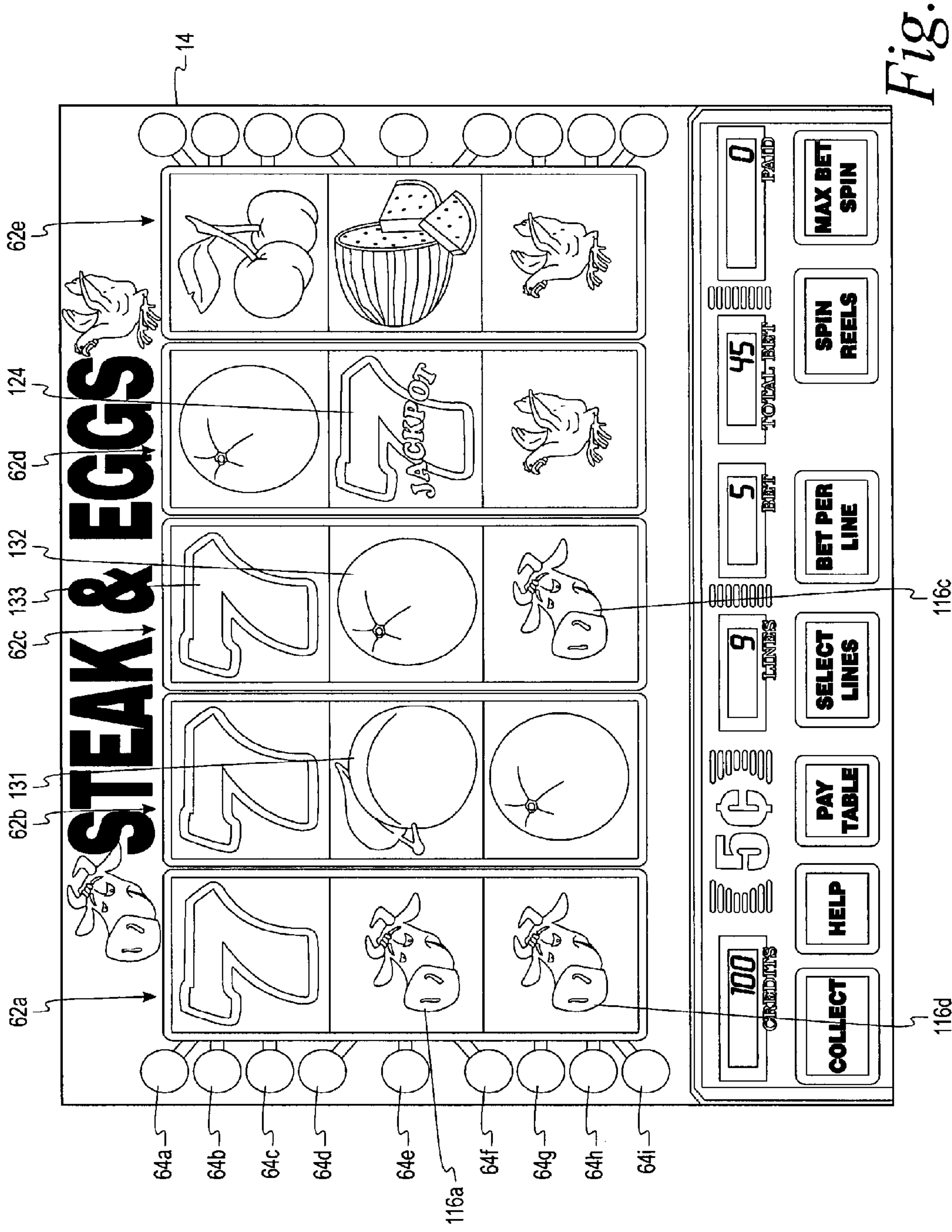
FIG. 31 is a display of a screen subsequent to FIG. 27.

Another variation is that instead of a random cascade, a shaped cascade occurs. In the embodiment described in FIGS. 27 and 31, after the winning combination of three cow symbols 116*a*, 116*b*, 116*c* is achieved, symbols comprising a diamond shape around the center cell in the array (cow symbol 116*c*) disappear. In the embodiment illustrated in FIG. 27, cow symbol 116*b*, watermelon symbol 122, peach symbol 118, and seven symbol 130 all disappear, causing a cascade. The result is shown in FIG. 31. As shown, in the second reel 62*b*, the cow symbol 62*b* disappears, causing a peach symbol 131 to cascade. In the middle reel 62*c*, both the seven symbol 130 and the watermelon symbol 122 have disappeared, causing the cow symbol 116*c* to drop to the bottom row and a new orange symbol 132 and a new seven symbol 133 to enter the third reel 62*c* from the top. In the fourth reel 62*d*, the peach symbol 118 has disappeared, causing the seven symbol 124 to cascade. If a new winning combination is achieved (such as the three seven symbols in the top row), the player is granted a corresponding award. In some embodiments, a new winning combination may result in another cascade—the shape may be the same shape as before or a new shape. The shape that triggers a cascade may be any shape or pattern, such as squares, rectangles, corners, or triangles. The shape may be selected randomly or according to a set of rules.

In one example, a method of conducting a wagering game having a randomly selected outcome includes displaying a plurality of symbols in an array indicating the randomly selected outcome. In response to the randomly selected outcome including a winning symbol combination, a plurality of symbols are removed and other symbols are moved into positions of the array vacated by the plurality of removed symbols. The plurality of removed symbols creates a pattern.

Cascade Matching Symbols

Figure 32:
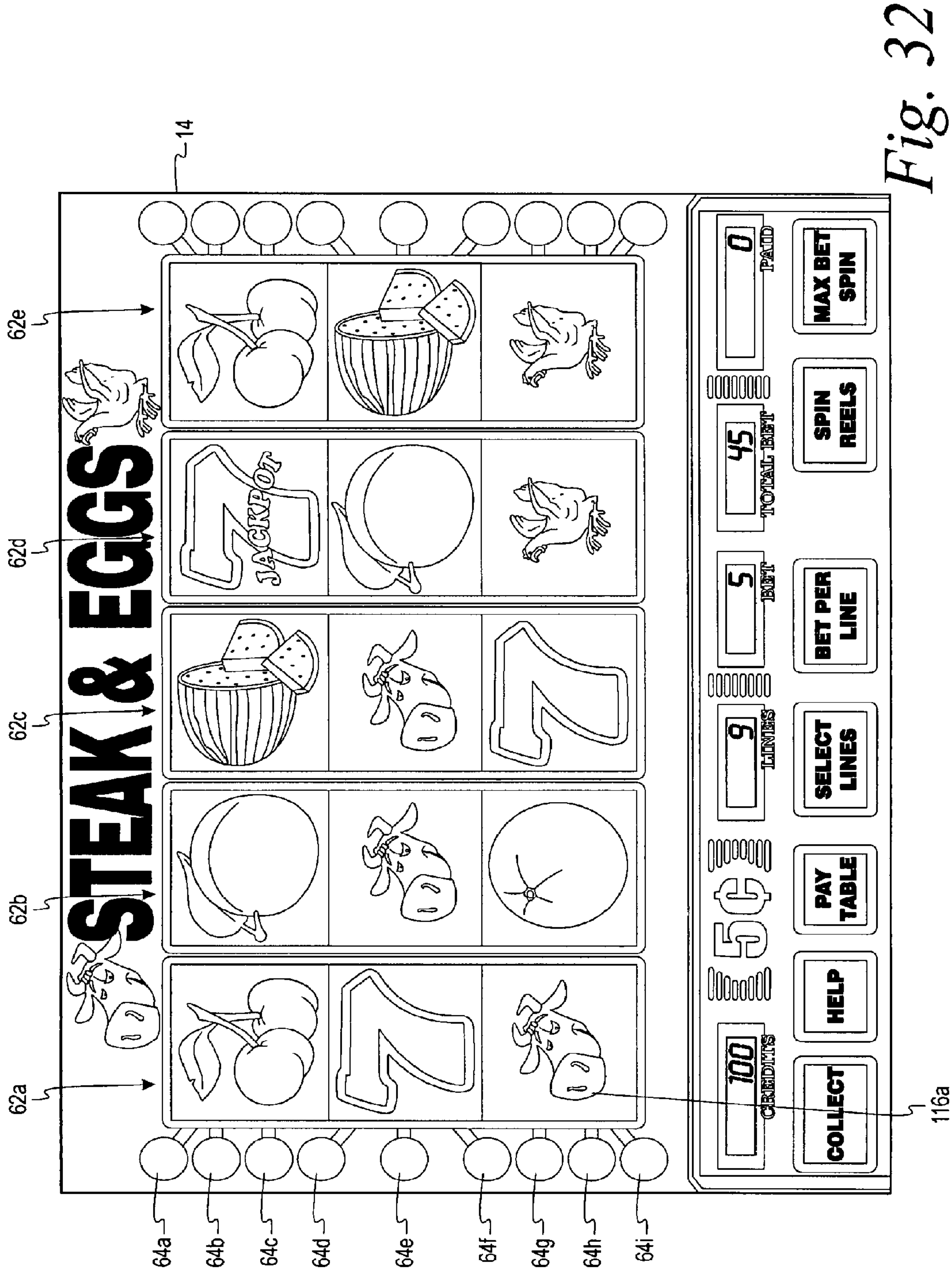
FIG. 32 is a display of a screen subsequent to FIG. 27.

In an alternative embodiment shown in FIGS. 27 and 32, symbols matching the symbols in a winning combination, but not included in the winning combination, disappear and trigger a cascade. In FIG. 27, the three cow symbols 116*a*, 116*b*, 116*c* form a winning combination. In this embodiment, any other cow symbol (cow symbol 116*d* as shown in FIG. 27) disappears and triggers a cascade. FIG. 32 displays the outcome of the cascade. The cow symbol 116*d* has disappeared, causing cow symbol 116*a* to cascade into the last row. The gaming machine 10 grants an award for any new winning combinations. Any new winning combinations may cause a cascade. Alternatively, there may be only one cascade. In other embodiments, the cascades may occur for a predetermined amount of time or a predetermined number of times.

In one example, a method of conducting a wagering game having a randomly selected outcome includes displaying a plurality of symbols in an array indicating the randomly selected outcome. In response to the randomly selected outcome including a winning symbol combination, at least one symbol that is not a part of the winning symbol combination is removed and other symbols are moved into a position of the array vacated by the at least one removed symbol. The at least one removed symbol matches a symbol in the winning symbol combination.

Buy a Cascade

Figure 33:
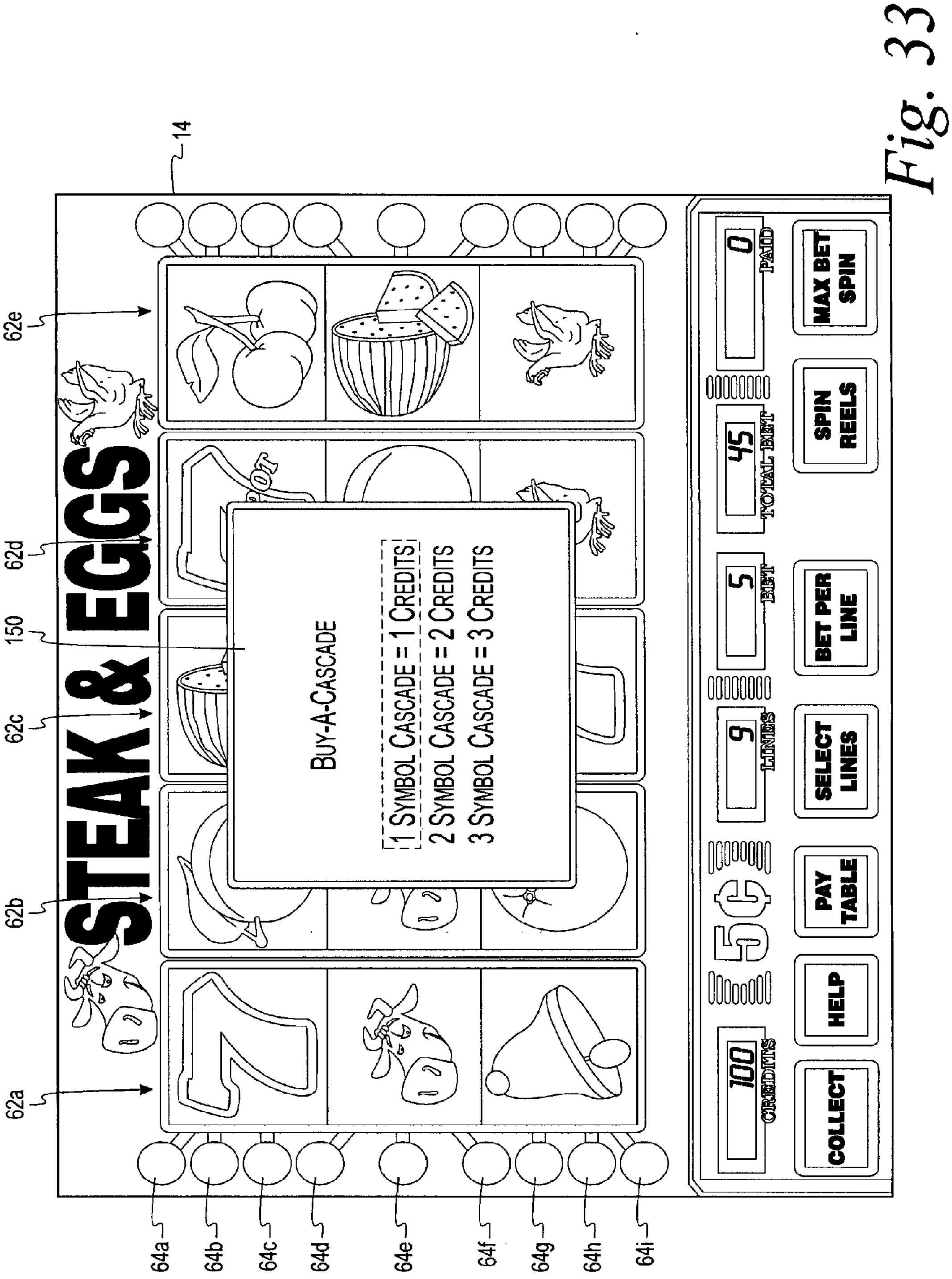
FIG. 33 is an initial display of a pop-up screen according to one embodiment of the present invention.

Turning now to FIG. 33, another embodiment of the present invention is described below. In this embodiment, prior to the wagering game being played, a pop-up screen 150 is displayed. The pop-up screen 150 offers to let the user "buy a cascade." In this embodiment, the player may purchase a one-symbol cascade for one credit, a two-symbol cascade for two credits, or a three-symbol cascade for three credits. The pop-up screen 150 may be a touch screen, such that if a player chooses to buy a single-symbol cascade, one credit is debited from the player's credit amount. In other embodiments, the gaming machine 10 may have a corresponding physical button (not shown) for the player to select. After the player spins the reels, the outcome is evaluated for winning combinations. If a winning combination is achieved, then one of the winning symbols will disappear and trigger a cascade.

Figure 34:
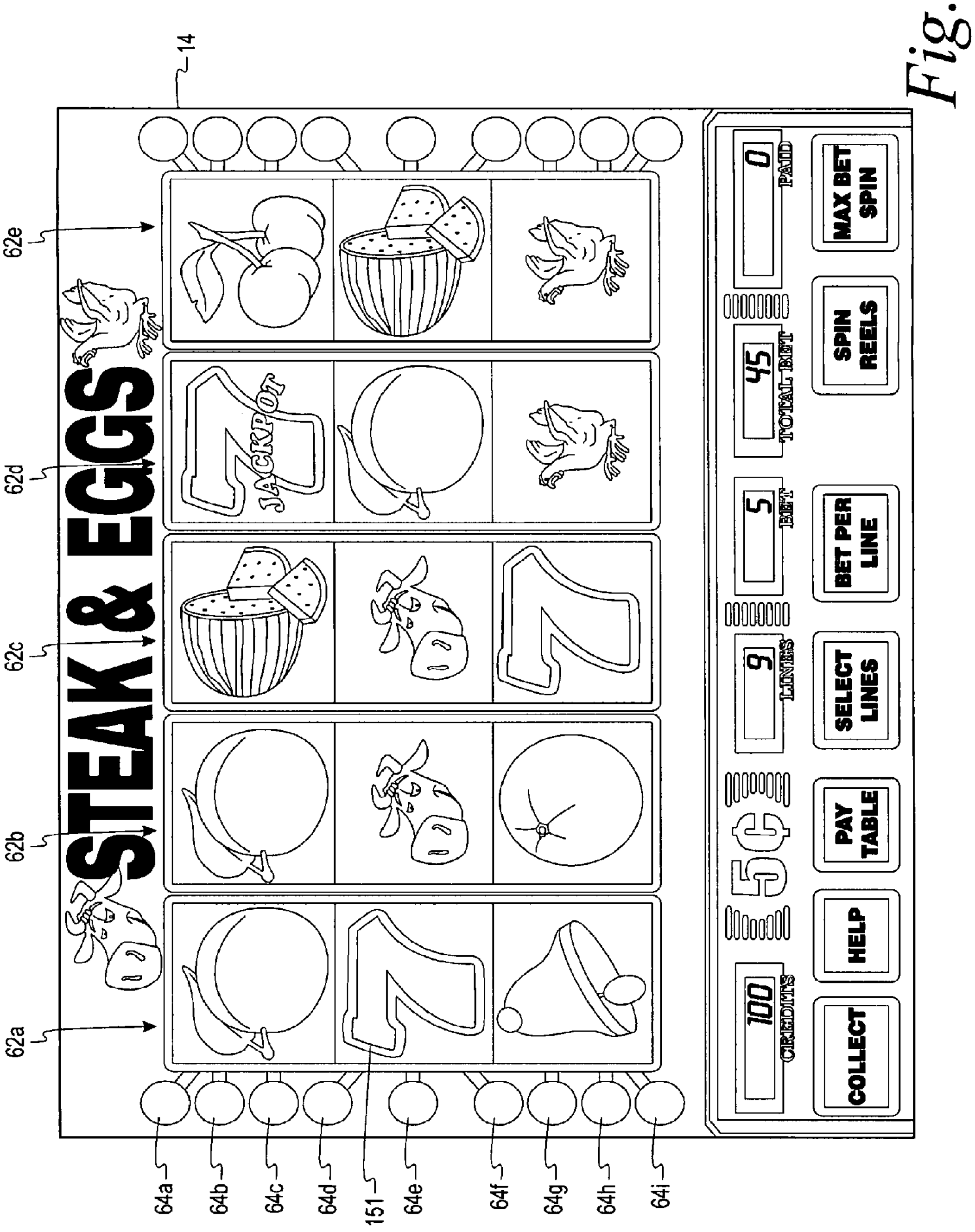
FIG. 34 is a display of a screen subsequent to FIG. 33.

For example, if the outcome is the display shown in FIG. 10, then the three cow symbols 81*a*, 81*b*, 81*c* are a winning outcome and one of the cow symbols 81*a* disappears, causing a seven symbol 151 above it to cascade down as shown in FIG. 34. If there are any new winning outcomes, the player is granted an award.

In one example, a method of conducting a wagering game having a randomly selected outcome is includes providing a player with an option to purchase a cascade feature. A plurality of symbols are displayed in an array and indicate the randomly selected outcome. In response to the player selecting to purchase a cascade and the randomly selected outcome including a winning symbol combination, at least one symbol is removed and other symbols are moved into a position of the array vacated by the at least one removed symbol.

Trade a Winning Combination for a Cascade

Figure 35:
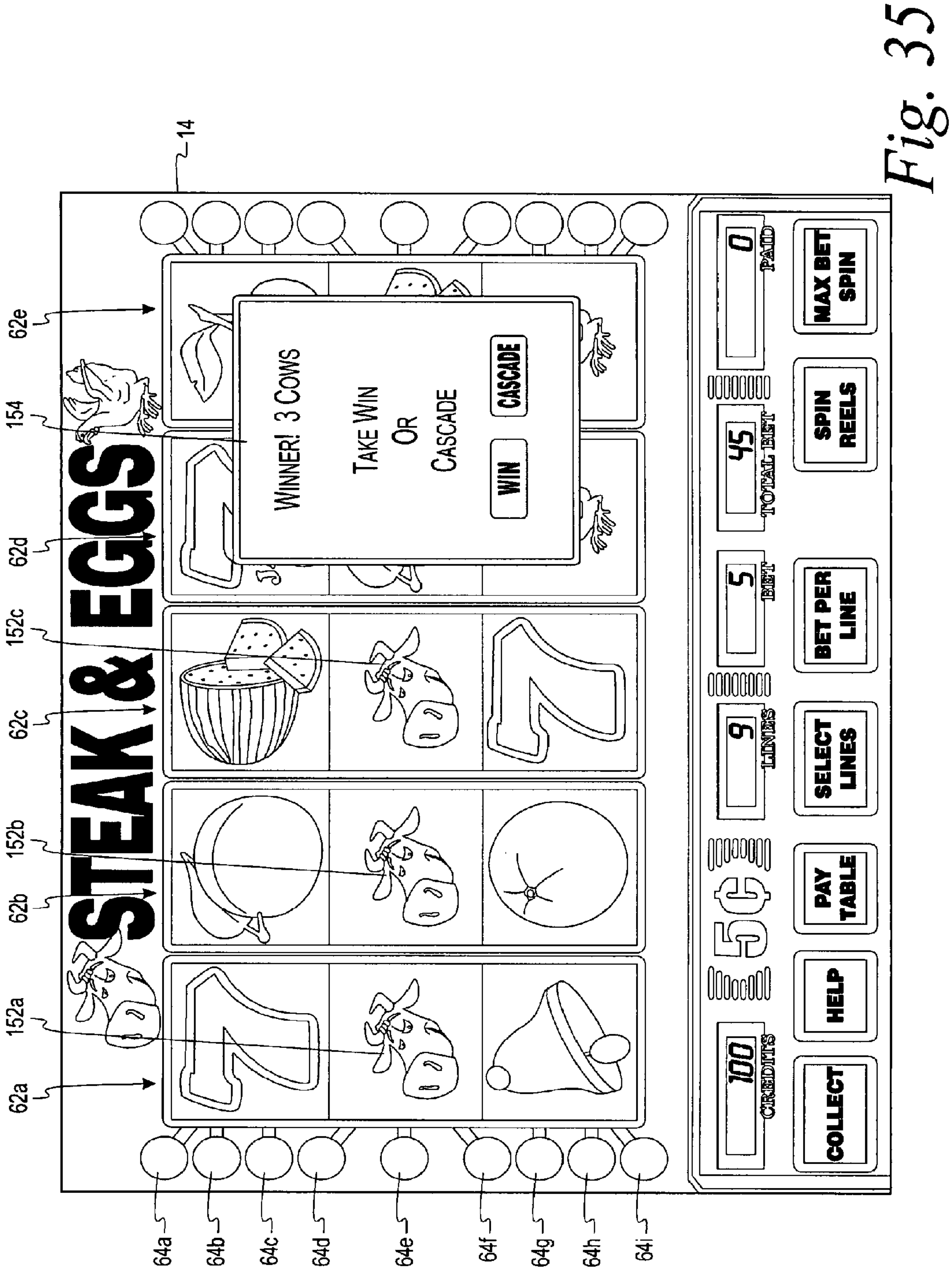
FIG. 35 is a pop-up screen according to one of the embodiments of the present invention.

In FIG. 35, a player has a winning combination of three cow symbols 152*a*, 152*b*, 152*c*. In response to the winning combination being achieved, a pop-up screen 154 appears. The pop-up screen 154 offers the player the opportunity to accept the win or take the cascade. The pop-up screen 154 may be a touch screen, as shown, allowing the player to select a button on the pop-up screen 154. Alternatively, the gaming machine 10 may have a physical button (not shown) for this function. If the player accepts the win, the player is granted the corresponding award. If the player takes the cascade, the player does not get any award, but instead the three cow symbols 152*a*, 152*b*, 152*c* disappear and trigger a cascade from above. The player is taking a chance that the cascading symbols will result in a bigger payout than the original winning combination. In some embodiments, the player may be granted the return of the wagered credits and the cascade of symbols.

In one example, a method of conducting a wagering game having a randomly selected outcome includes displaying a plurality of symbols in an array indicating the randomly selected outcome. In response to the randomly selected outcome including a winning symbol combination, providing a player with an option to keep the winning symbol combination or to have a cascade. In response to the player selecting to have a cascade, at least one symbol is removed and other symbols are moved into a position of the array vacated by the at least one removed symbol.

Reveal Hidden Symbols

Figure 36:
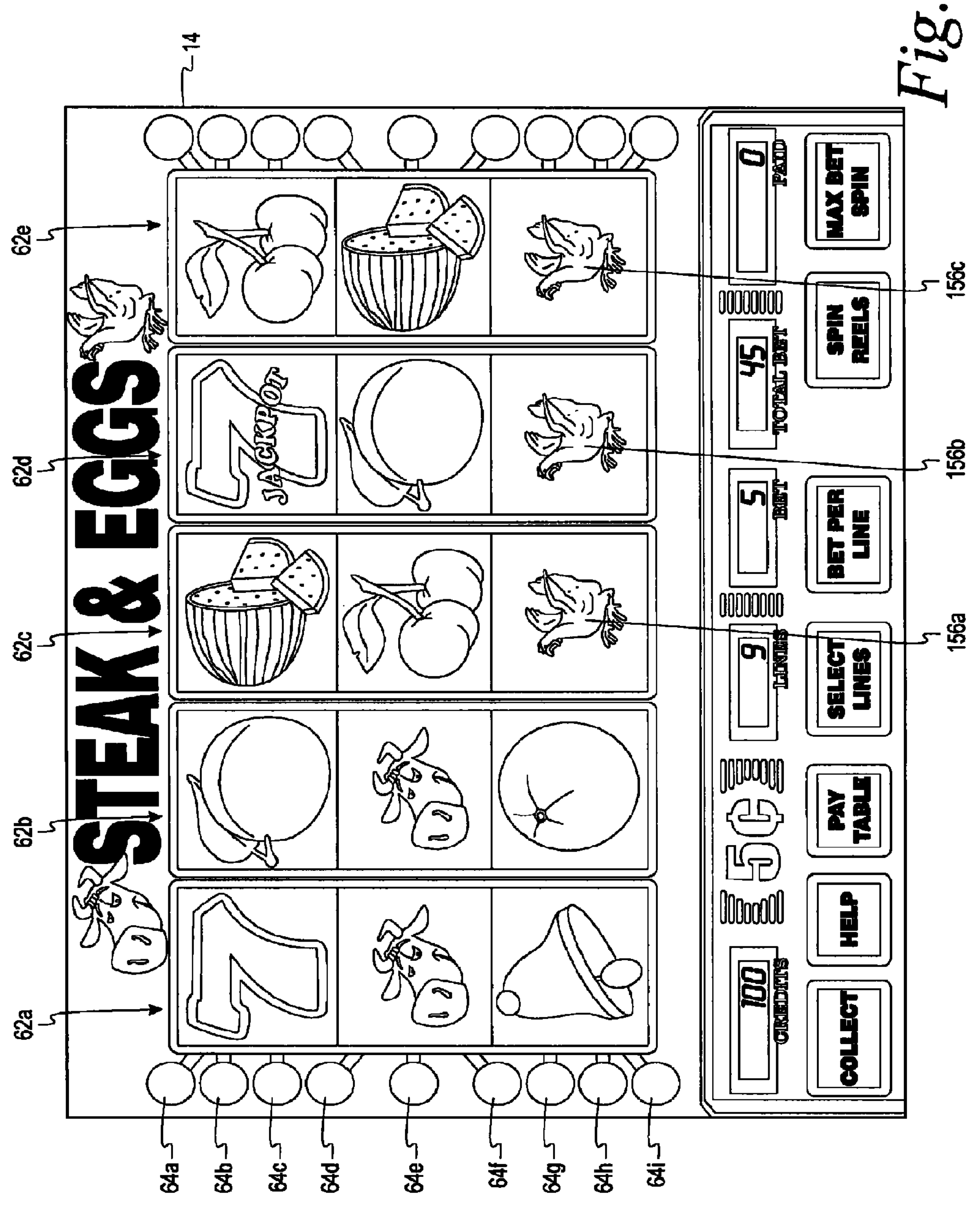
FIG. 36 is an initial basic game according to one embodiment of the present invention.
Figure 37:
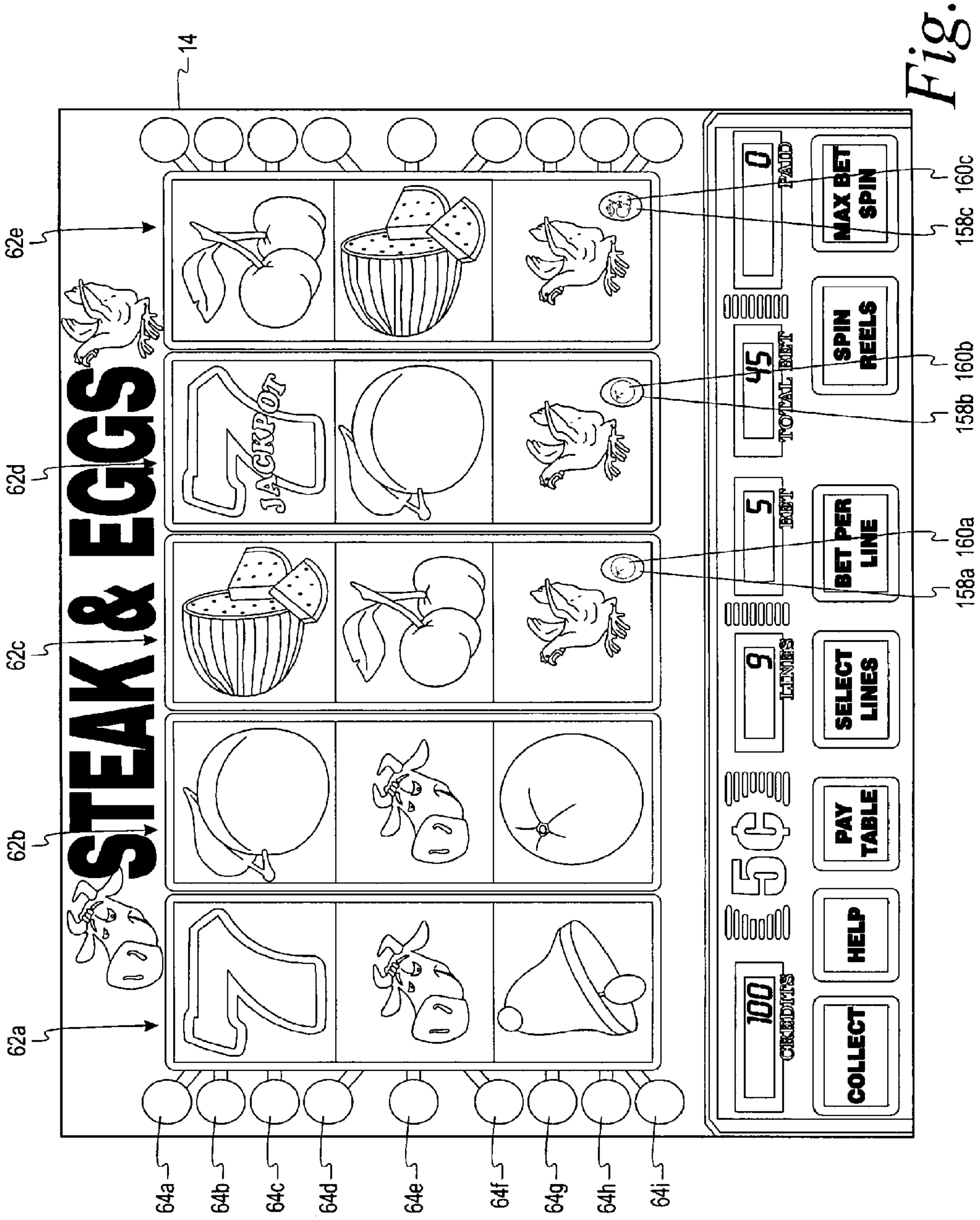
FIG. 37 is a display of a screen subsequent to FIG. 36.

In another embodiment, a winning combination reveals a hidden symbol behind the symbols of the winning combination. As shown in FIG. 36, three chicken symbols 156*a*, 156*b*, 156*c* in the bottom row are a right-to-left winning combination. In FIG. 37, the three chicken symbols 156*a*, 156*b*, 156*c* lay eggs 158*a*, 158*b*, 158*c* that reveal new symbols 160*a*, 160*b*, 160*c*. The chicken symbols 156*a*, 156*b*, 156*c* may remain a part of the array—effectively causing two symbols in a single location, or the chicken symbols 156*a*, 156*b*, 156*c* can disappear. Those new symbols 160*a*, 160*b*, 160*c* are then evaluated along with all of the original symbols to determine whether any new winning combinations exist. As shown in this embodiment, the new symbols 160*a*, 160*b*, 160*c* may be different from each other. Each symbol in this embodiment has a "counterpart" symbol that may be a subscript. For example, cow symbols may have a baby calf as a subscript, the baby calf having a new symbol branded on the calf.

In one example, a method of conducting a wagering game having a randomly selected outcome includes displaying a plurality of symbols in an array indicating the randomly selected outcome. At least one of the plurality of symbols includes a hidden-symbol. In response to the randomly selected outcome including a winning symbol combination and a symbol in the winning symbol combination also having a hidden symbol, the hidden symbol is revealed.

While the present invention has been described with reference to one or more particular embodiments, those skilled in the art will recognize that many changes may be made thereto without departing from the spirit and scope of the present invention. For example, each of the cascades has occurred from top-to-bottom. However, it should be understood that the cascade can occur in any direction, including, bottom-to-top, right-to-left, left-to-right, and diagonally. Also, the above-described embodiments have the cascade or symbol replacement occur in response to a winning symbol combination being achieved. In other embodiments, the cascade or symbol replacement can randomly occur or occur based upon a set of rules determined by the gaming machine manufacturer and/or the casino where the gaming machine is located.

Another alternative which may be used with any of the above-described embodiments is the use of the cascading symbols to trigger a bonus event or game-enhancement function. For example, a certain number of symbol cascades in sequence, such as four cascades in sequence in a base game may trigger a bonus event or game-enhancement function. The cascades may occur among symbols in a winning combination as described for example in FIGS. 13-14, a non-winning combination as described for example in FIGS. 15*a*-15*b*, or a combination of winning and non-winning symbols as described for example in FIGS. 4-6. The bonus event or game-enhancement function may include for example, a multiplier of any award granted, additional credits added to the payout, a free spin or spins in addition to the payout, a special feature, a secondary game, eligibility in a special community event with other players such as a progressive jackpot, etc. The symbol cascade in sequence after the number of cascades triggering the bonus event or game-enhancement function has been achieved provides access to better bonus events and game-enhancement functions. For example, the fifth symbol cascade may cause the bonus event to be played with a multiplier or access a better bonus event. Other examples of better bonus events or game-enhancement functions include better multipliers, larger number of credits added to an award, additional free spins, increased plays for a special community event, etc. Subsequent cascading symbols, such as a sixth symbol cascade, may result in even greater bonus events or game-enhancement functions. Of the number of cascades to trigger such bonuses may be greater or lesser than the four cascades described in the above example.

Each of these embodiments and obvious variations thereof is contemplated as falling within the spirit and scope of the claimed invention, which is set forth in the following claims.

What is claimed is:

1. A gaming system comprising:

an input device for receiving a wager to play a wagering game;

a display for displaying an array of symbols having a plurality of array positions displayable to a player, a plurality of reels each having a plurality of symbols in reel positions, the array positions showing symbols in selected reel positions that indicate a randomly selected outcome of the wagering game, at least one symbol in a selected reel position of the array having an initial state; and a controller coupled to the input device and the display, the controller operative to:

(i) in response to a first play of the wagering game meeting a first predetermined criterion, cause the at least one symbol in the selected reel position in the array positions to transition from an initial state to an intermediate state, (ii) in response to a subsequent play of the wagering game meeting a second predetermined criterion, cause the at least one symbol in the selected reel position to transition from an intermediate state to a removable state, and (iii) remove the at least one symbol in the removable state.

2. The system of claim 1, wherein the array is formed by a plurality of movable reels.

3. The system of claim 1, wherein the first predetermined criterion is at least one of a location of the at least one symbol within a particular cell in the array, the at least one symbol landing on a pay line, the at least one symbol being part of a winning symbol combination, the at least one symbol being adjacent to a state-altering symbol in the array, a player placing a side wager and the at least one symbol landing on the pay line on the display, the at least one symbol appearing on the display a predetermined number of times, or the at least one symbol being part of a predetermined non-winning symbol combination.

4. The system of claim 1, wherein in response to the at least one symbol being in an intermediate state, the display displaying the at least one symbol as being cracked.

5. The system of claim 1, further comprising a second intermediate state, and in response to the first predetermined criterion being met, the controller being operative to transition the at least one symbol from the intermediate state to a second intermediate state.

6. The system of claim 1, wherein the controller is further operative to cause another symbol to move into a position in the array vacated by the removed symbol.

7. A method of conducting a wagering game comprising:

displaying a plurality of symbols in an array having a plurality of array positions displayable to a player, a plurality of reels each having a plurality of symbols in reel positions, the array positions showing symbols in selected reel positions indicating a randomly selected outcome on a display, at least one symbol being in an initial state;

in response to a first predetermined criterion being met during a first play of the wagering game, causing the at least one symbol in the selected reel position in the array to transition from the initial state to an intermediate state by at least one of one or more processors;

in response to a second predetermined criterion being met during a subsequent play of the wagering game, at least one of the one or more processors causing the at least one symbol in the selected reel position in the array to transition from the intermediate state to a removable state; and removing the at least one symbol from the array.

8. The method of claim 7, wherein at least one of the first and second predetermined criterion is a winning symbol combination being achieved.

9. The method of claim 7, wherein at least one of the first and second predetermined criterion is the at least one symbol entering a predetermined location on the array.

10. The method of claim 9, wherein the predetermined location is a location that is adjacent to a state-altering symbol.

11. The method of claim 7, wherein the first and second predetermined criterion are the same.

12. The method of claim 7, further comprising moving another symbol into a position of the array vacated by the at least one removed symbol.

13. The method of claim 12, wherein the step of moving other symbols comprises cascading symbols adjacent to the removed symbol.

14. The method of claim 13, wherein the cascading occurs vertically.

15. The method of claim 12, wherein the moving other symbols into a position of the array vacated by the at least one removed symbol comprises inserting a symbol that was previously not in the array into the position of the array vacated by the at least one removed symbol.

16. A gaming terminal comprising:

an input device for receiving a wager to play a wagering game;

a display for displaying an array of symbols having a plurality of array positions displayable to a player, a plurality of reels each having a plurality of symbols in reel positions, the array positions showing symbols in selected reel positions that indicate a randomly selected outcome of the wagering game, at least one symbol in a selected reel position of the array having an initial state; and a processor coupled to the input device and the display, the processor operative to:

(i) in response to a first play of the wagering game meeting a first predetermined criterion, cause the at least one symbol in the selected reel position in the array positions to transition from an initial state to an intermediate state, (ii) in response to a subsequent play of the wagering game meeting a second predetermined criterion, cause the at least one symbol in the selected reel position to transition from an intermediate state to a removable state, and (iii) remove the at least one symbol in the removable state.

17. The gaming terminal of claim 16, wherein the array is formed by a plurality of movable reels.

18. The gaming terminal of claim 16, wherein the first predetermined criterion is at least one of a location of the at least one symbol within a particular cell in the array, the at least one symbol landing on a pay line, the at least one symbol being part of a winning symbol combination, the at least one symbol being adjacent to a state-altering symbol in the array, a player placing a side wager and the at least one symbol landing on the pay line on the display, the at least one symbol appearing on the display a predetermined number of times, or the at least one symbol being part of a predetermined non-winning symbol combination.

19. The gaming terminal of claim 16, wherein the in response to the at least one symbol being in an intermediate state, the display displaying the at least one symbol as being cracked.

20. The gaming terminal of claim 16, further comprising a second intermediate state, and in response to the first predetermined criterion being met, the processor being operative to transition the at least one symbol from the intermediate state to a second intermediate state.

* * * * *